US012420742B2

(12) United States Patent
Zizzadoro

(10) Patent No.: US 12,420,742 B2
(45) Date of Patent: Sep. 23, 2025

(54) VEHICLE SECURITY DEVICE WITH MOBILE DEVICE CONTROL

(71) Applicant: Joseph P. Zizzadoro, Commack, NY (US)

(72) Inventor: Joseph P. Zizzadoro, Commack, NY (US)

(*) Notice: Subject to any disclaimer, the term of this patent is extended or adjusted under 35 U.S.C. 154(b) by 209 days.

(21) Appl. No.: 18/496,581

(22) Filed: Oct. 27, 2023

(65) Prior Publication Data
US 2024/0144746 A1 May 2, 2024

Related U.S. Application Data

(60) Provisional application No. 63/419,858, filed on Oct. 27, 2022, provisional application No. 63/533,810, filed on Aug. 21, 2023.

(51) Int. Cl.
B60R 25/24 (2013.01)
B60R 16/023 (2006.01)
B60R 25/00 (2013.01)
B60R 25/04 (2013.01)
B60R 25/08 (2006.01)
B60R 25/104 (2013.01)
B60R 25/23 (2013.01)
G06F 21/44 (2013.01)
G07C 5/00 (2006.01)
G07C 9/00 (2020.01)

(52) U.S. Cl.
CPC ............ B60R 25/24 (2013.01); B60R 16/023 (2013.01); B60R 25/005 (2013.01); B60R 25/04 (2013.01); B60R 25/08 (2013.01); B60R 25/104 (2013.01); B60R 25/23 (2013.01); G06F 21/44 (2013.01); G07C 5/00 (2013.01); G07C 9/00 (2013.01)

(58) Field of Classification Search
CPC ......... B60R 25/00; B60R 25/01; B60R 25/04; B60R 25/08; B60R 25/104; B60R 25/23; B60R 25/24; G07C 5/00; G07C 5/08; G07C 9/00; B60L 11/18; B60L 53/16; B60L 53/65
See application file for complete search history.

(56) References Cited

U.S. PATENT DOCUMENTS 6,373,148 B1 * 4/2002 Daiss ................. G07C 9/00563
307/10.6
10,857,977 B1 * 12/2020 Lacroix ................. B60R 25/245
2014/0200757 A1 * 7/2014 Kojima .................... B60L 53/65
701/22

* cited by examiner

Primary Examiner — Van T Trieu
(74) Attorney, Agent, or Firm — HALEY GUILIANO LLP

(57) ABSTRACT

A method for mobile device control of vehicle security features that includes monitoring the status of predetermined vehicle conditions of a vehicle. In response to detecting the activation of one or more of the predetermined vehicle conditions, the method also includes monitoring the vehicle to detect an execution of one or more preset authentication verification signals for the vehicle. In response to detecting no execution of any preset authentication verification signals for the vehicle, the method also includes, based on the predetermined vehicle settings, sending a security enablement command to the body control module (BCM) of the vehicle via the embedded software, and based on the security enablement command, enabling one or more security schemes via the BCM.

20 Claims, 16 Drawing Sheets

┌─────────────────────────────────────────────┐
│ Receive user selections of one or more vehicle │ 802
│ operation modes and settings for the one or more │
│ vehicle operation modes via the user interface screen │
└─────────────────────────────────────────────┘
              ↓
┌─────────────────────────────────────────────┐
│ Store the user selections of the one or more vehicle │ 804
│ operation modes and the settings for the one or more │
│ vehicle operation modes in the memory │
└─────────────────────────────────────────────┘
              ↓
┌─────────────────────────────────────────────┐
│ Receive user selections of options to set the one or more │ 806
│ predetermined vehicle conditions and settings for the one or more │
│ predetermined vehicle conditions via the user interface screen │
└─────────────────────────────────────────────┘
              ↓
┌─────────────────────────────────────────────┐
│ Store the user selections of the options to set the │ 808
│ one or more predetermined vehicle conditions │
│ and settings for the one or more predetermined │
│ vehicle conditions in the memory │
└─────────────────────────────────────────────┘
              ↓
┌─────────────────────────────────────────────┐
│ Receive user selections of one or more preset authentication │ 810
│ verification signals for the vehicle and settings for the one │
│ or more preset authentication verification signals for the │
│ vehicle via the user interface screen │
└─────────────────────────────────────────────┘
              ↓
┌─────────────────────────────────────────────┐
│ Store the user selections of the one or more preset │ 812
│ authentication verification signals for the vehicle and │
│ the settings for the one or more preset authentication │
│ verification signals for the vehicle in the memory │
└─────────────────────────────────────────────┘
              ↓
┌─────────────────────────────────────────────┐
│ Receive user selections of one or more security │ 814
│ schemes for the vehicle and settings for the one or │
│ more security schemes for the vehicle │
└─────────────────────────────────────────────┘
              ↓
┌─────────────────────────────────────────────┐
│ Store the user selections of the one or more security │ 816
│ schemes for the vehicle and settings for the one or │
│ more security schemes for the vehicle │
└─────────────────────────────────────────────┘

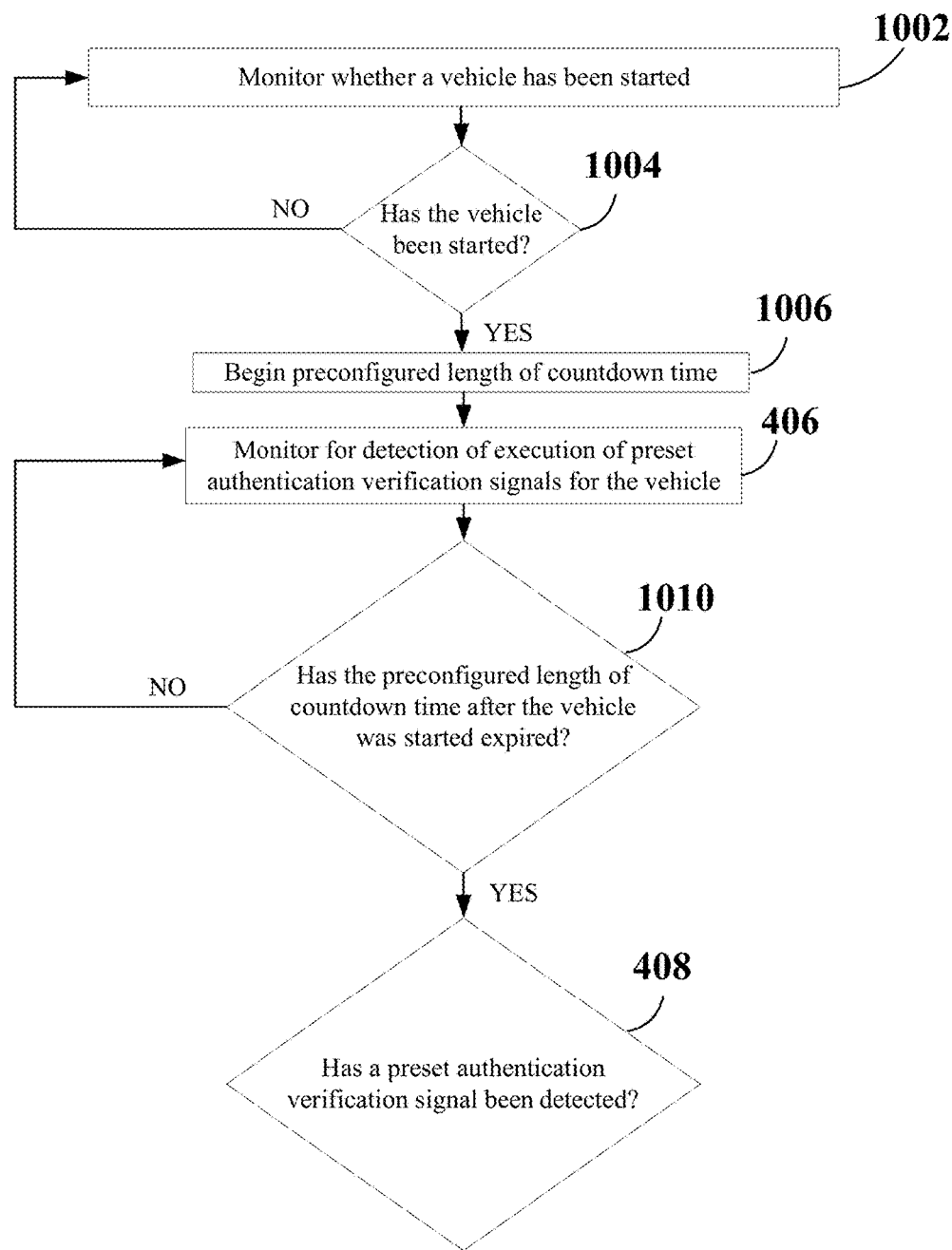

VEHICLE SECURITY DEVICE WITH MOBILE DEVICE CONTROL

CROSS-REFERENCE TO RELATED APPLICATION

This application claims the benefit under 35 U.S.C. § 119(e) of U.S. Provisional Patent Application No. 63/419,858, filed on Oct. 27, 2022, and U.S. Provisional Patent Application No. 63/533,810, filed on Aug. 21, 2023, which are hereby incorporated by reference herein in their entireties. The entire contents of commonly owned U.S. patent application Ser. No. 15/441,467, filed Feb. 24, 2017, now U.S. Pat. No. 9,849,826, and U.S. application Ser. No. 18/099,125, filed Jan. 19, 2023, are incorporated by reference herein in their entireties.

BACKGROUND

Field

Example aspects herein relate generally to a vehicle security device with mobile device control, and, more particularly, to methods, devices, and computer-readable media for a vehicle security device with mobile device control and for configuring a vehicle security device with mobile device control.

Related Art

Mobile devices, such as smartphones, smartwatches, other wearables, and/or the like, have become ubiquitous. While operating a vehicle, a person typically carries one or more mobile devices that are uniquely identifiable and associated with their user account or profile. Although some vehicles enable a mobile device to control certain vehicle features, such as unlocking vehicle doors, it would be beneficial to expand the vehicle features that are controllable using a mobile device, such as security features. Accordingly, a need exists for an improved means of mobile device vehicle control that addresses the foregoing challenges.

SUMMARY

According to an example embodiment herein, a method for mobile device control of vehicle security features is provided. The method includes monitoring the status of predetermined vehicle conditions of a vehicle via embedded software; in response to detecting the activation of one or more of the predetermined vehicle conditions via the embedded software, monitoring the vehicle to detect an execution of one or more preset authentication verification signals for the vehicle via the embedded software; in response to detecting, via the embedded software, no execution of any preset authentication verification signals for the vehicle, based on the predetermined vehicle settings, sending a security enablement command to the body control module (BCM) of the vehicle via the embedded software; and based on the security enablement command, enabling one or more security schemes via the BCM.

In one example, the method further includes, in response to detecting the execution of one or more preset authentication verification signals for the vehicle via the embedded software, and in response to determining that one or more security schemes are currently enabled, sending a security disablement command to the BCM via the embedded software; and based on the security disablement command, disabling the one or more security schemes.

In another example, activation of the one or more predetermined vehicle conditions are the expiration of a preconfigured length of countdown time after a vehicle is started, the expiration of a preconfigured length of countdown time after a connected mobile device falls out of signal range, or the expiration of a preconfigured length of countdown time after a key leaves the vehicle.

In another example, the one or more preset authentication verification signals for the vehicle are in-vehicle selection sequences or the detection of a paired and authorized Bluetooth device. In some examples, the in-vehicle selection sequences are one or more particular button presses of buttons located on the dashboard of the vehicle, the steering wheel of the vehicle or key fobs associated with the vehicle.

In a further example, the one or more security schemes are a brake activation scheme, an accelerator pedal scheme, a light show scheme, a horn honk scheme, a driving time limit scheme, a driving distance limit scheme, or a driving speed limit scheme.

In a further example, the one or more preset authentication verification signals for the vehicle and the one or more security schemes are preconfigured by a user via a personal computing application. In this example, preconfiguring the personal computing application includes user selections of options to set the one or more predetermined vehicle conditions and settings for the one or more predetermined vehicle conditions via a user interface screen. Further, in this example, preconfiguring the personal computing application includes receiving user selections of one or more preset authentication verification signals for the vehicle and settings for the one or more preset authentication verification signals for the vehicle. Also, in this example, preconfiguring the personal computing application includes receiving user selections of one or more vehicle operation modes and settings for the one or more vehicle operation modes via the user interface screen. In this example, preconfiguring the personal computing application also includes storing the user selections of options to set the one or more predetermined vehicle conditions and settings for the one or more predetermined vehicle conditions the user selections of the one or more preset authentication verification signals for the vehicle and settings for the one or more preset authentication verification signals for the vehicle, the user selections of the one or more vehicle operation modes and the settings for the one or more vehicle operation modes in a memory.

In one example, the embedded software detects the execution of one or more preset authentication verification signals for the vehicle by broadcasting information relating to the one or more preset authentication verification signals on a communication bus of the vehicle, wherein the communication bus is a controller area network (CAN) bus.

In another example, the embedded software detects the each execution of one or more preset authentication verification signals for the vehicle by polling one or more of a steering column module (SCM) and a wireless control module (WCM) of the vehicle by transmitting an I/O read request and awaiting a response.

In further example, polling one or more of the SCM and the WCM of the vehicle by transmitting an I/O read request and awaiting a response includes transmitting to one or more of the SCM and the WCM, a command to start a diagnostic session via the embedded software; transmitting, to one or more of the SCM and the WCM, a command to read the each preset authentication verification signal for the vehicle, along with the correct values to read the each preset authentication verification signal for the vehicle via the embedded software; and transmitting, to one or more of the SCM and the WCM, a periodic tester command to ensure the command to read the each preset authentication verification signal for the vehicle is running via the embedded software.

In one example, sending a security enablement command to the BCM via the embedded software further includes transmitting, to the BCM, a command to start a diagnostic session via the embedded software; transmitting, to the BCM, one or more input/output control commands via the embedded software, wherein the one or more input/output control commands each specify one or more particular vehicle brakes and the actuation level of the each one or more particular vehicle brakes, a vehicle accelerator pedal and the actuation level of the accelerator pedal, one or more particular vehicle lights and the actuation level of the each one or more particular vehicle lights, and a vehicle horn and the actuation level of the vehicle horn; transmitting, to the BCM, a periodic tester command to ensure the one or more input/output control commands are running, via the embedded software; and transmitting a command to end the diagnostic session via the embedded software.

According to another example embodiment herein, an onboard diagnostic plug-in dongle device for mobile device control of vehicle security features is described. The device includes a shell, a plug, and a PC board. The PC board contains a microcontroller, and a memory. The memory stores instructions that, when executed by the microcontroller, cause the microcontroller to monitor the status of predetermined vehicle conditions of a vehicle, and in response to detecting the activation of one or more of the predetermined vehicle conditions via the embedded software, monitor the vehicle to detect an execution of one or more preset authentication verification signals for the vehicle via the embedded software; and in response to detecting no execution of any preset authentication verification signals for the vehicle via the embedded software, based on predetermined vehicle settings, send a security enablement command to the body control module (BCM) of the vehicle via the embedded software, and based on the security enablement command, enable, via the BCM, one or more security schemes.

In one example, the PC board contains a controller area network (CAN) controller, a physical layer device (PHY), a power supply, a universal serial bus (USB) bridge and connector, an indicator LED, and support components. In some embodiments, when the hardware device is plugged into a suitable port of a vehicle, at least one of the CAN controllers is communicatively coupled to the vehicle CAN bus and another one of the CAN controllers is coupled to the powertrain control module (PCM) or another module of the vehicle.

In a further example, the microcontroller executes the embedded software via the CAN controller and the PHY.

In a further example, the plug is an OBD2 plug, and the plug is installed into the OBD2 diagnostic connector of the vehicle.

In a further example, the plug is installed by unplugging the vehicle security gateway (SGW) module of the vehicle and plugging the device in its place, directly or via an extension cable. In some examples, the device may be installed by hardwiring to the vehicle harness for power and CAN connections directly.

In a further example, the onboard diagnostic plug-in dongle device has a bypass module that bypasses the security gateway (SGW) of the vehicle.

In another example, the microcontroller communicates with a personal computing application for configuration and updates via the USB bridge and connector. In some embodiments, as described in further detail below with reference to FIG. 2, the microcontroller is configured to execute the embedded program to implement various features by sending messages/data to the PCM (or sending messages/data to other modules to emulate the PCM) to manipulate or incorrectly report data such as vehicle speed, engine RPM, and/or the like. In some aspects, the microcontroller can control other vehicle functions directly by way of direct data injection and/or communication of diagnostic commands. In further embodiments, after the hardware device is set up and initialized, the embedded software of the device configures the CAN controller and USB bridge for proper baud rates.

According to another example embodiment herein, a non-transitory computer-readable medium is described. The non-transitory computer-readable medium has instructions stored thereon that, when executed by the microcontroller of the onboard diagnostic plug-in dongle, cause the microcontroller to perform a method for mobile device control of vehicle security features. The method includes monitoring the status of predetermined vehicle conditions of a vehicle via embedded software; in response to detecting the activation of one or more of the predetermined vehicle conditions via the embedded software, monitoring the vehicle to detect an execution of one or more preset authentication verification signals for the vehicle via the embedded software; in response to detecting, via the embedded software, no execution of any preset authentication verification signals for the vehicle, based on the predetermined vehicle settings, sending a security enablement command to the body control module (BCM) of the vehicle via the embedded software; and based on the security enablement command, enabling one or more security schemes via the BCM.

BRIEF DESCRIPTION OF THE DRAWINGS

Various aspects and features of the present disclosure are described herein below with references to the drawings, wherein:

FIG. 8 is a process flow diagram that illustrates an example procedure for preconfiguring the personal computing application, in accordance with the present disclosure;

FIG. 10A is a process flow diagram that illustrates additional aspects of the example procedure for mobile device control of vehicle security features of FIG. 4, in accordance with the present disclosure;

DETAILED DESCRIPTION

The present disclosure is directed towards methods, devices, and computer-readable media for mobile device control for vehicle security features and for configuring mobile device control for vehicle security features. In general, the methods, devices, and computer-readable media provide a means of executing security features, for instance, to enable one or more of a brake activation scheme, an accelerator pedal scheme, a light show scheme, a horn honk scheme, a driving time limit scheme, a driving distance limit scheme, or a driving speed limit scheme, for example, in response to the expiration of a countdown time after a vehicle is started (or after detecting the loss of a connected device or key fob) without the detection of an authentication signal, e.g., a PIN sequence, the presence of a connected Bluetooth device, or the presence of a key fob.

Figure 1A:
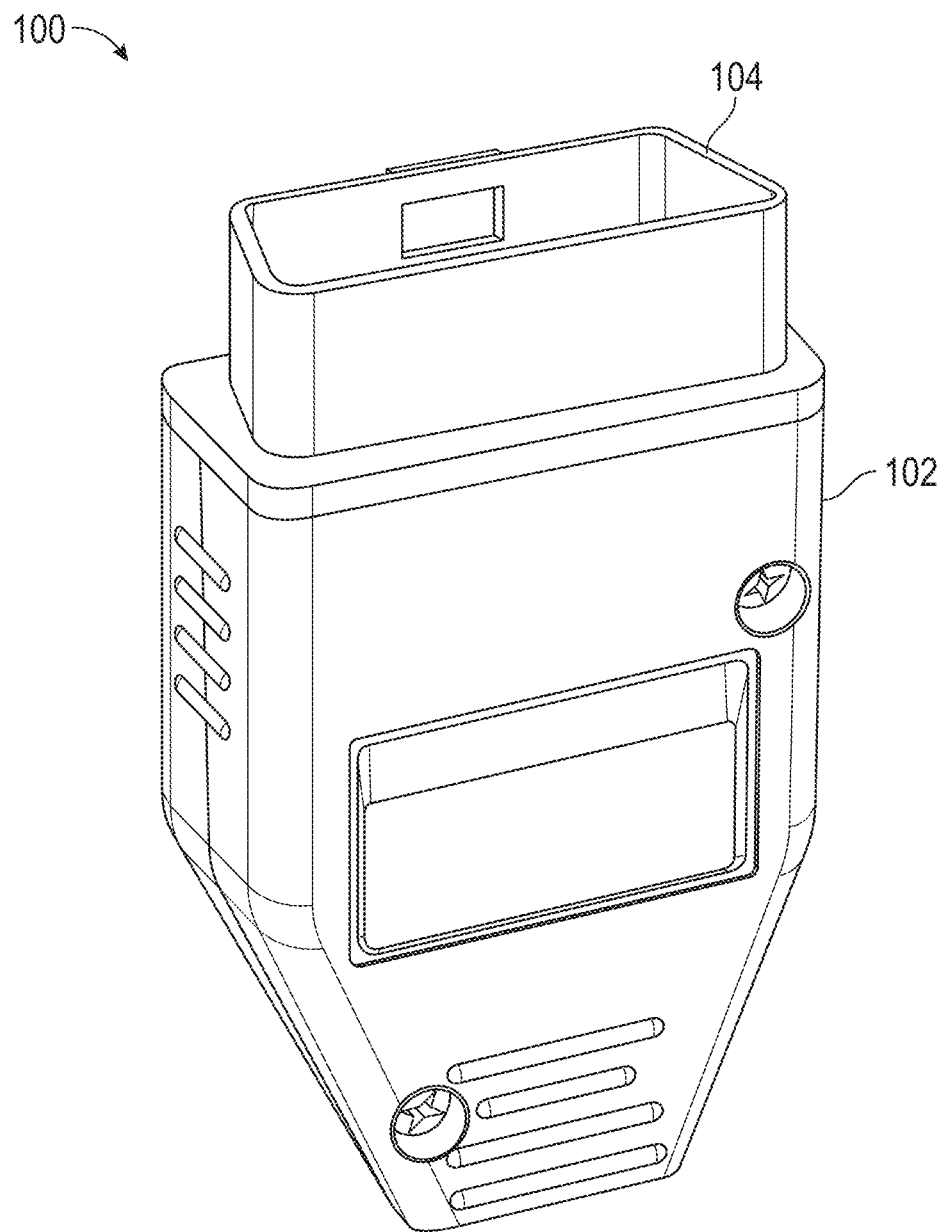
FIG. 1A is an example onboard diagnostic plug-in device, in accordance with the present disclosure.

Reference is now made to FIG. 1A, which is an example onboard diagnostic plug-in device 100, in accordance with the present disclosure. The onboard diagnostic plug-in device 100 includes a plastic shell 102 and an On-Board Diagnostic OBD2 plug 104.

Figure 1B:
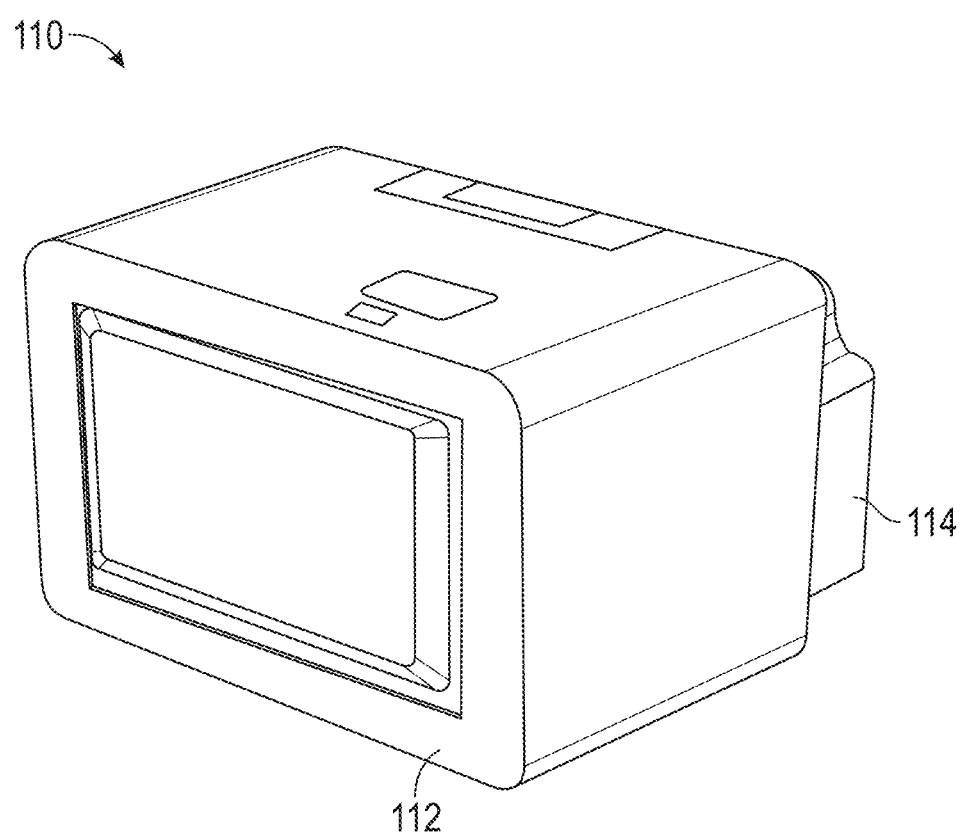
FIG. 1B is an example onboard diagnostic plug-in device, in accordance with the present disclosure.

Reference is now made to FIG. 1B, which is an example onboard diagnostic plug-in device 110, in accordance with the present disclosure. The onboard diagnostic plug-in device 110 includes a plastic shell 112 and a vehicle SGW module plug 114. In some embodiments, the onboard diagnostic plug-in device 110 may be installed by unplugging a vehicle SGW module and plugging the onboard diagnostic plug-in device 110 in its place by the vehicle SGW module plug 114, directly or via an extension cable.

Figure 2:
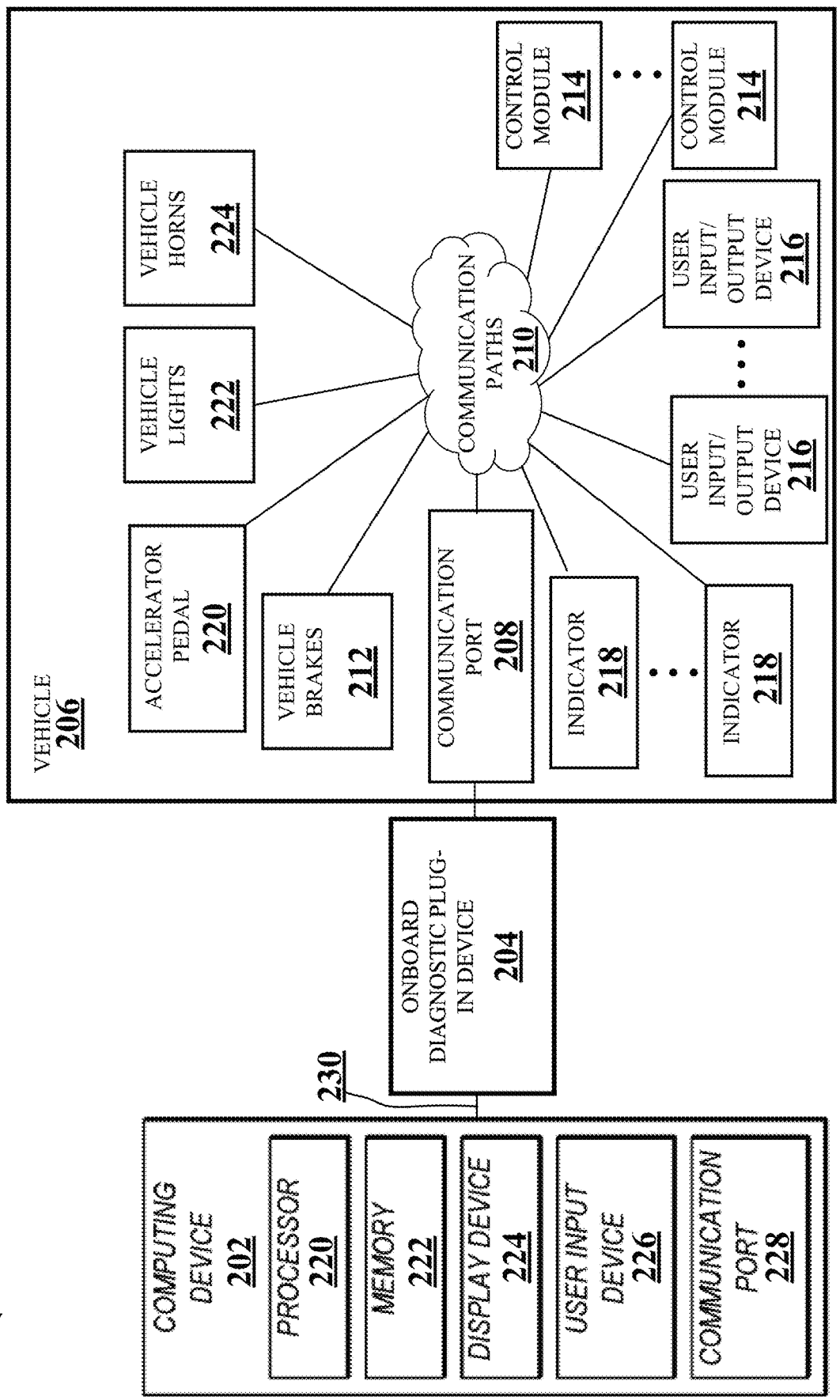
FIG. 2 is a schematic block diagram of an example system for mobile device control of vehicle security features, in accordance with the present disclosure.

Reference is now made to FIG. 2, which is a schematic block diagram of an example system 200 for mobile device control for vehicle security features, in accordance with the present disclosure. The system 200 includes a computing device 202, an onboard diagnostic plug-in device 204, and a vehicle 206. The computing device 202 includes a processor 220, a memory 222, a display device 224, a user input device 226, a communication port 228, and a communication path 230. In some embodiments, the communication port 228 is a USB port, the communication path 230 includes a USB cable, and the onboard diagnostic plug-in device 204 is communicatively couplable to the communication port 228 of the computing device 202 by way of the USB cable of the communication path 230. In some embodiments, the computing device 202 is further represented by the computing device 900 illustrated in FIG. 9, which is described in further detail below. The vehicle 206 includes a communication port 208, communication paths 210, vehicle brakes 212, one or more control modules 214, one or more user input/output devices 216, and one or more indicators 218, accelerator pedal 236, vehicle lights 232, and vehicle horns 234. Various ones of the communication port 208, the vehicle brakes 212, the one or more control modules 214, the one or more user input/output devices 216, the one or more indicators 218, the accelerator pedal 236, the vehicle lights 232, and the vehicle horns 234 are communicatively coupled to one another by way of the communication paths 210. In some embodiments, the onboard diagnostic plug-in device 204 is the onboard diagnostic plug-in device 100 of FIG. 1A. In some embodiments, the onboard diagnostic plug-in device 204 is the onboard diagnostic plug-in device 110 of FIG. 1B.

The communication port 208 is a port by which the onboard diagnostic plug-in device 204 can be coupled to, and communicate with, various components of the vehicle 206. In some examples, the communication port is an on-board diagnostics (OBD) port, such as an OBD2 port, that is defined in accordance with a standard, such as the SAE J1962 standard, and that is included on the vehicle 206 by the manufacturer to facilitate diagnosis of various components and/or subsystems of the vehicle 206 using diagnostic equipment.

The communication paths 210 are paths by which one or more signals or messages may be communicated among the communication port 208, vehicle brakes 212, one or more control modules 214, one or more user input/output devices 216, the one or more indicators 218, the accelerator pedal 236, the vehicle lights 232, and/or the vehicle horns 234. When the onboard diagnostic plug-in device 204 is coupled to the communication port 208, the communication paths 210 facilitate communication of one or more signals or messages between the onboard diagnostic plug-in device 204 and vehicle brakes 212, one or more control modules 214, one or more user input/output devices 216, one or more indicators 218, accelerator pedal 236, vehicle lights 232, and/or vehicle horns 234. The communication paths 210 may include any type of communication paths suitable for such communication. In one example, the communication paths 210 include a standardized bus, such as a controller area network (CAN) bus.

The vehicle brakes 212 are brakes installed within the vehicle 206 that may be actuated to stop the motion of one or more wheels of the vehicle.

The one or more control modules 214 are electronic modules that include hardware and/or software components that cooperate to control one or more components and/or subsystems of vehicle 206. Example types of the control modules 214 include, without limitation, a body control module, an anti-lock brake control module (ABM), a cruise control module, a security module, an active damping control module, an occupant restraint control module, a park assist control module, a powertrain control module, a radio control module, a steering column control module, and/or the like.

The user input/output devices 216 generally include devices by which the user may provide input (for example, input relating to one or more vehicle security schemes and/or input to control the onboard diagnostic plug-in device 204) and/or devices by which the user may be provided with output (for example, output indicating a state of the onboard diagnostic plug-in device 204). Example types of the user input/output devices 216 include, without limitation, a steering wheel button, a dashboard button, a wireless key fob button, a button located on a door of the vehicle, a key ignition, a voice-based user input device, a dashboard screen, a console screen, audio speakers, and/or the like. The user may provide input to the vehicle 206 and/or to the onboard diagnostic plug-in device 204, by providing one or more user input commands (for example, a single command or a combination of commands) to one or more of the user input/output devices 216.

The indicators 218 are indicators within the vehicle 206 that report to the driver of the vehicle 206 important information about how the vehicle 206 is traveling. Example types of the indicators 218 include, without limitation, a four-wheel drive indicator, a speedometer, and/or the like.

The accelerator pedal 236 is the accelerator pedal installed within the vehicle 206 that may be disabled to stop the motion of the vehicle.

The vehicle lights 232 are lights installed within the vehicle 206 that may be actuated (e.g., illuminated or extinguished) to draw attention to the vehicle in the form of a flash and/or strobe light pattern.

The vehicle horns 234 are one or more horns installed within the vehicle 206 that may be actuated (e.g., sounded or extinguished) to draw attention to the vehicle through loud sounds.

As described in further detail herein, the onboard diagnostic plug-in device 204 is communicatively and independently couplable to the computing device 202 and to the vehicle 206 by way of communication ports, of which only some are shown in FIG. 2. The onboard diagnostic plug-in device 204, when coupled to the vehicle 206 (for instance, by being plugged into the communication port 208), enables the user to control vehicle security features (for example, including causing executing one or more security schemes involving the vehicle brakes 212, accelerator pedal 236, vehicle lights 232, or vehicle horns 234) of the vehicle 206. The computing device 202, when coupled to the onboard diagnostic plug-in device 204 (for example, by way of the communication port 208 and a communication path of the communication paths 210), enables the user to configure vehicle security schemes. For instance, the user can input commands to the computing device 202 to cause the onboard diagnostic plug-in device 204 to locally store a variety of settings for various security schemes, as described in further detail below.

Figure 3:
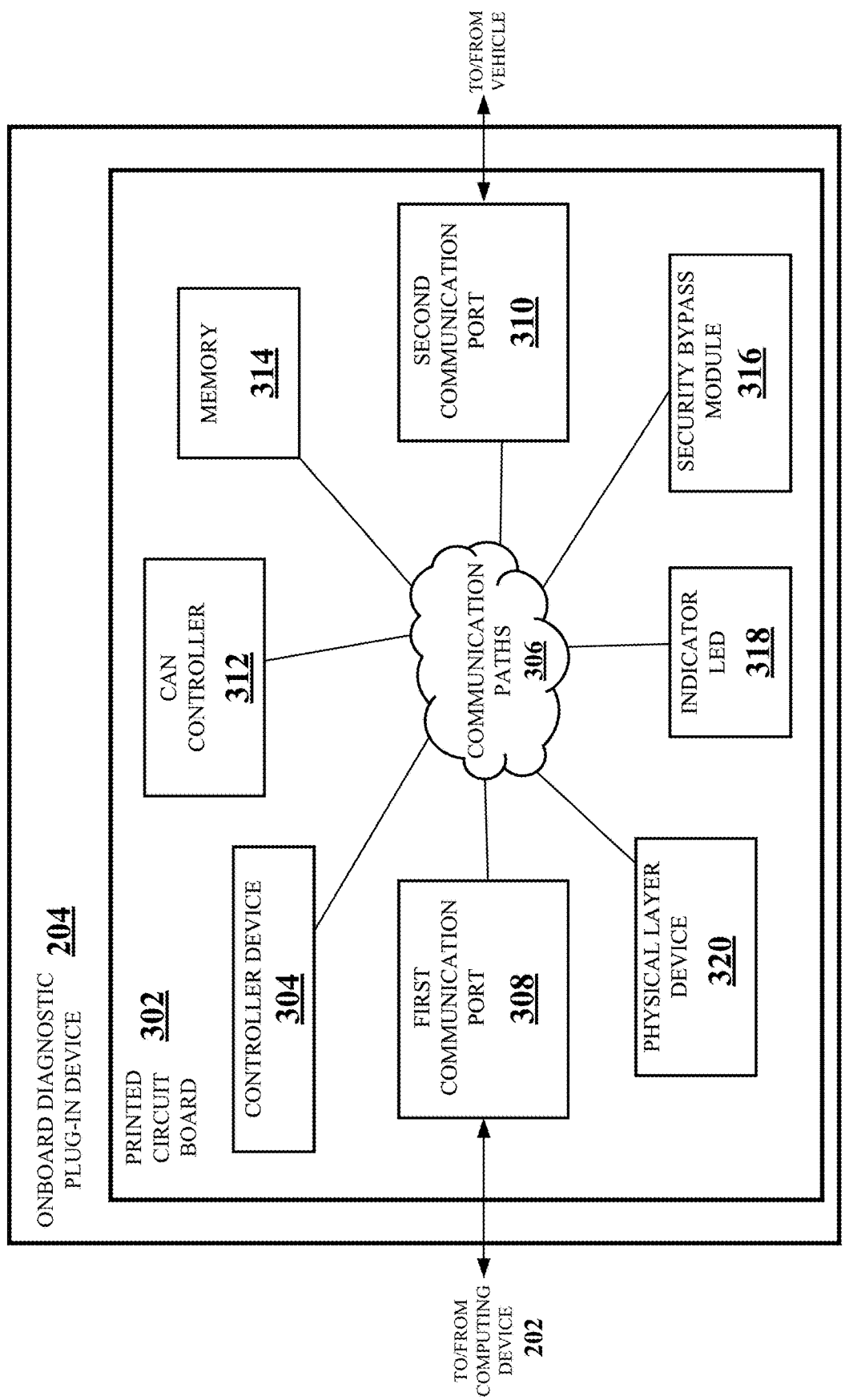
FIG. 3 is a schematic block diagram of an example onboard diagnostic plug-in device for mobile device control of vehicle security features that may be included in the system of FIG. 2, in accordance with the present disclosure.

Having provided an overview of the system 200 for mobile device control for vehicle security features in the context of FIG. 2, reference is made to FIG. 3 to describe additional aspects of the onboard diagnostic plug-in device 204 of the system 200, in accordance with the present disclosure. Additionally, in some embodiments, the onboard diagnostic plug-in device 204 is further represented by the computing device 900 illustrated in FIG. 9, which is described in further detail below. Referring to FIG. 3, the onboard diagnostic plug-in device 204 includes a printed circuit board 302. The printed circuit board 302 includes a controller device 304, communication paths 306, a first communication port 308, a second communication port 310, a CAN controller 312, a memory 314, a security bypass module 316, an indicator LED 318, and a physical layer device 320. Various ones of the controller device 304, the first communication port 308, the second communication port 310, the CAN controller 312, the memory 314, the security bypass module 316, the indicator LED 318, and the physical layer device 320 are communicatively coupled to one another by way of the communication paths 306.

The controller device 304 controls the operation and/or functionality of the onboard diagnostic plug-in device 204. In some embodiments, the controller device 304 executes an embedded program that communicates with the vehicle via one or more of the CAN controller 312 and the physical layer device 320. The controller device 304 also can communicate with the computing device 202 for configuration and updates via the communication port 228, as described further below with reference to FIG. 7. In some embodiments, after the onboard diagnostic plug-in device 204 is powered on, the controller device 304 executes an embedded program to configure the CAN controller 312 and the first communication port for proper baud rates. In some embodiments, the controller device 304 causes one or more security schemes involving the vehicle brakes 212, accelerator pedal 236, vehicle lights 232, or vehicle horns 234 to be enabled or disabled, as described further below in reference to FIG. 4. In some embodiments, the controller device 304 causes embedded software to detect execution of one or more preset authentication verification signals for the vehicle, as described further below with reference to FIG. 5. In some embodiments, the controller device 304 causes embedded software to send security enablement commands to the BCM of the vehicle, as described further below with reference to FIG. 6.

In various embodiments, the controller device 304 may be a microcontroller (such as, for example, an Atmel® AT90CAN64 microcontroller, an Atmel® AT90CAN128 microcontroller, an Atmel® ATmega328A microcontroller, Atmel® ATmega328P microcontroller or a SAMC21 microcontroller), a processor (such as the processor 1104 described below), a module (such as an ESP32 module made by Espressif) or any other type of device that controls the operation and/or functionality of the onboard diagnostic plug-in device 204.

As mentioned above, the communication paths 306 communicatively couple the components of the onboard diagnostic plug-in device 204 to another. The communication paths 306 may include any type of communication paths suitable to facilitate communication. In one example, one or more components of the onboard diagnostic plug-in device 204 are mounted to a substrate, such as the printed circuit board 302 and the communication paths 306 include conductive traces deposited on or within the substrate.

The first communication port 308 is a port by which the onboard diagnostic plug-in device 204 may be communicatively coupled to the computing device 202, for example, by way of the communication port 228.

The second communication port 310 is a port by which the onboard diagnostic plug-in device 204 can be communicatively coupled with one or more components of the vehicle 206 by way of the communication port 208 of the vehicle 206. In one example, the second communication port 310 is an OBD port, such as an OBD2 port, that is defined in accordance with a standard, such as the SAE J1962 standard, and that is couplable to an OBD port (for example, communication port 208) included on the vehicle 206 by the manufacturer. In this manner, the onboard diagnostic plug-in device 204 is a plug-and-play-type device that can easily be coupled to the vehicle 206 and decoupled from the vehicle 206.

The memory 314 is any memory that stores data, instructions, and/or other types of information that the controller device 304 can utilize to effect the operation and/or functionality of the onboard diagnostic plug-in device 204. The memory 314 may be a standalone memory component or may be integrated into one or more other components of the onboard diagnostic plug-in device 204, such as controller device 304. The memory 314 stores, among other information, instructions that the controller device 304 executes to effect the operation and/or functionality of the onboard diagnostic plug-in device 204, for instance, by implementing steps of the procedures described herein.

In some embodiments, the security bypass module 316 bypasses a security gateway of vehicle 206.

In some embodiments, the indicator LED 318 may be illuminated to indicate status information.

In some embodiments, if the embedded software of controller device 304 receives commands via the USB bridge or Bluetooth/Wifi connection, it processes them to change configuration, perform specific functions, perform embedded firmware updates, and/or the like. For example, the embedded software senses vehicle power-down and places itself into a low-power sleep mode. In another example, the embedded software can communicate with the vehicle display(s) to allow user to configure, set up, or otherwise control various functions of the embedded device.

Additionally, although not shown in FIG. 3, in various embodiments, the onboard diagnostic plug-in device 204 also includes one or more additional components that enable the onboard diagnostic plug-in device 204 to function. Example types of such additional components include a crystal or other clock source that generates a clock signal to be used by one or more of the components of the onboard diagnostic plug-in device 204; one or more power supply components, for instance, a Texas Instruments® uA78L05CPKR voltage regulator, that generates a low voltage power signal, such as a 5 volt power signal, from a higher voltage power signal, such as a 12 volt power signal, that is provided to the onboard diagnostic plug-in device 204 by the vehicle 206 by way of one or more conductors of the communication port 208 and the second communication port 310; a programming header that is couplable to a programming device to enable the controller device 304 and/or the memory 314 to be programmed with instructions or other information; passive components, such as resistors, inductors, and/or capacitors, and/or the like.

Figure 4:
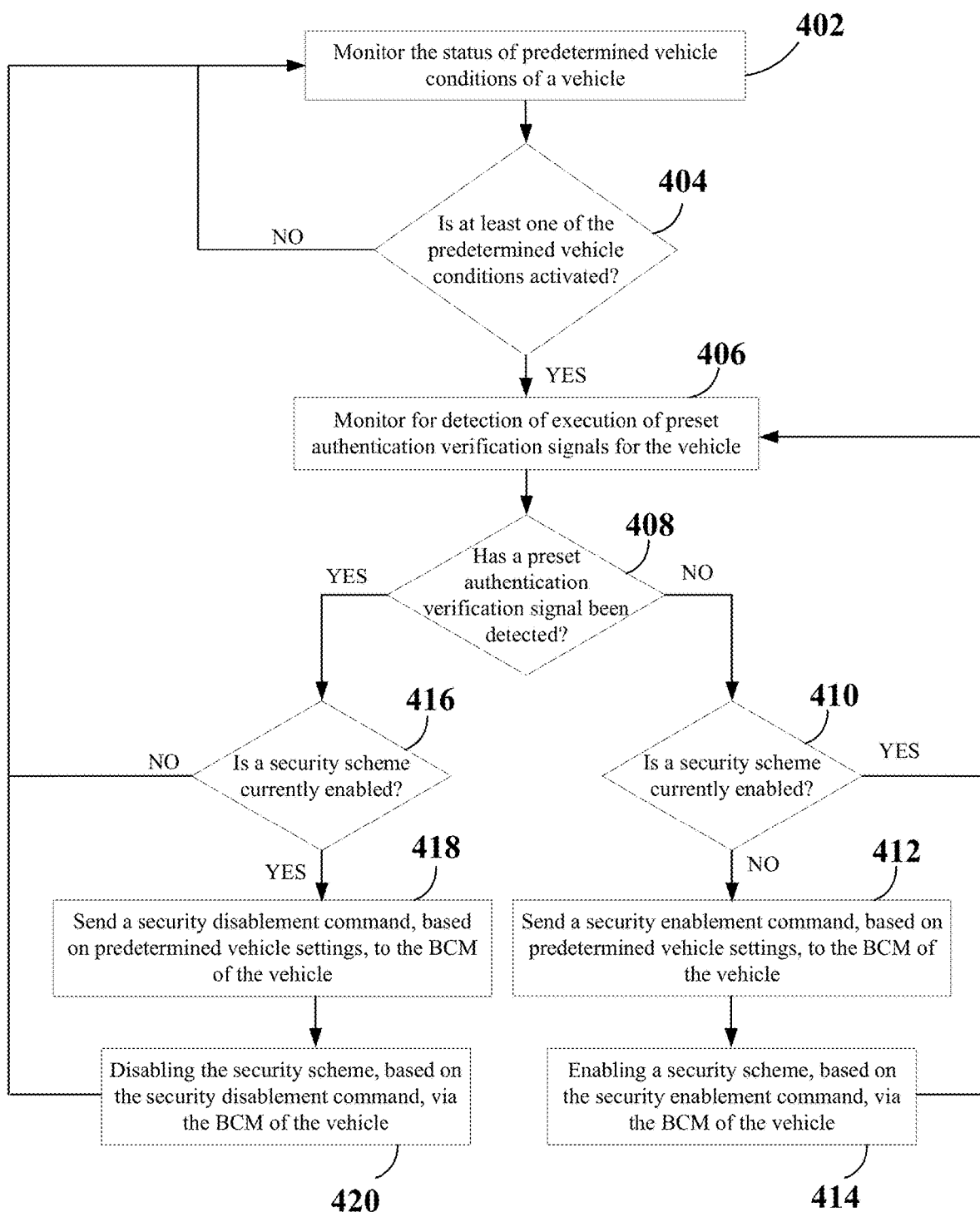
FIG. 4 is a process flow diagram that illustrates an example procedure for mobile device control of vehicle security features, in accordance with the present disclosure.

Having described the system 200 for automotive brake control and the onboard diagnostic plug-in device 204 in the context of FIG. 2 and FIG. 3, reference is now made to FIG. 4 to describe an example procedure 400 for mobile device control of vehicle security features by using the onboard diagnostic plug-in device 204 of the system 200, in accordance with the present disclosure. The procedure 400, in some examples, begins when the onboard diagnostic plug-in device 204 is plugged into the communication port 208 and receives power from the vehicle 206 by way of one or more pins or conductors of the communication port 208. In some embodiments, the procedure 400 begins only when anti-theft mode is enabled, as described further below with reference to FIG. 7. In some embodiments, anti-theft mode may be enabled by sensing a vehicle theft alarm, which controller device 304 executes by monitoring data on the CAN bus for the vehicle theft alarm trigger.

In some embodiments, at block 402, controller device 304 monitors the status of predetermined vehicle conditions of a vehicle, e.g., vehicle 206 of FIG. 2. This may entail, for example, monitoring for whether a preconfigured length of countdown time after the vehicle was started has expired, as described further below with reference to FIG. 10A, monitoring for whether a preconfigured length of countdown time after a connected device has fallen out of signal range has expired, as described further below with reference to FIG. 10B, or monitoring for whether a preconfigured length of countdown time after key is not detectable within the vehicle has expired, as described further below with reference to FIG. 10C. In some embodiments the predetermined vehicle conditions are preconfigured by a user via a user interface, as described further below with reference to FIG. 7.

In some embodiments, at block 404, a determination is made as to whether at least one of the predetermined vehicle conditions of vehicle 206 is activated. In particular, for instance, the controller device 304 detects whether one or more of the following conditions has occurred: a preconfigured length of countdown time after the vehicle was started has expired, a preconfigured length of countdown time after a connected device has fallen out of signal range has expired, or a preconfigured length of countdown time after key is not detectable within the vehicle has expired. In some embodiments, the predetermined length of countdown times are preconfigured by a user via a user interface, as described further below with reference to FIG. 7.

In some embodiments, if it is determined at block 404 that none of the predetermined vehicle conditions are activated ("NO" at 404), then the procedure 400 returns to block 402. If, on the other hand, it is determined at block 404 that one or more of the predetermined vehicle conditions are activated ("YES" at 404), then the procedure 400 progresses to block 406.

In some embodiments, at block 406, controller device 304 monitors for detection of execution of preset authentication verification signals for the vehicle via embedded software. In some embodiments the preset authentication verification signals are preconfigured by a user via a user interface, as described further below with reference to FIG. 7. In particular, controller device 304 is monitoring for detection of user input commands or signals from one or more user input/output devices 216. In some instances, controller device 304 is monitoring for detection of user input commands or signals from one or more user input/output devices 216, as described further below with reference to FIG. 5. In some embodiments, controller device 304 is monitoring for whether execution of an in-vehicle selection sequence has been detected, as described further below with reference to FIG. 11A, whether a key fob associated with the vehicle has been detected, as described further below with reference to FIG. 11B, or whether a paired and authorized Bluetooth device has been detected, as described further below with reference to FIG. 11C. The procedure 400 then progresses to block 408.

In some embodiments, at block 408, a determination is made as to whether a preset authentication verification signal has been detected. In particular, for instance, controller device 304 detects whether a user input command or a signal has been detected by way of one or more user input/output devices 216. In some embodiments, a user may enter the user input command by command by interacting with one or more of the user input/output devices individually (e.g., by entering a predetermined command), or in some simultaneous combination (e.g., pressing the "unlock" and the "open trunk" button on a key fob at the same time) or sequential combination (e.g., entering a predetermined combination of commands). In some embodiments, the predetermined commands are preconfigured by a user via a user interface, as described further below with reference to FIG. 7. In some embodiments, the detection of user input command entries varies by vehicle. In some embodiments, the signal from the one or more user input/output devices is the Bluetooth signal of a paired and authorized Bluetooth device. In some embodiments, the signal from the one or more user input/output devices is a wireless signal of a key fob associated with the vehicle. On some vehicles, user input information, e.g., button press information, or signals from user input/output devices, is constantly broadcast on a CAN bus, in which case, the determination at block 408 includes monitoring the one or more user input/output devices 216 for user input as it is broadcasted. In other vehicles, one or more control modules 214 (for example, a steering column module (SCM) or a wireless control module (WCM), sometimes referred to as a radio frequency hub (RF HUB) are polled at block 408 by sending an I/O read request and waiting for a response, as described further below with reference to FIG. 5.

In some embodiments, if it is determined at block 408 that no preset authentication verification signal has been detected ("NO" at 408), procedure 400 progresses to block 410. In some embodiments, if it is determined at block 408 that a preset authentication verification signal has been detected ("YES" at 408), procedure 400 progresses to block 416.

In some embodiments, at block 410, a determination is made as to whether a security scheme is currently enabled. In particular, for instance, the controller device 304 detects whether one or more of the following security schemes is already enabled: a brake activation scheme, an accelerator pedal scheme, a light show scheme, a horn honk scheme, a driving time limit scheme, a driving distance limit scheme, or a driving speed limit scheme. In some embodiments, the security schemes are preconfigured by a user via a user interface, as described further below with reference to FIG. 7.

In some embodiments, if it is determined at block 410 that a security scheme is currently enabled ("YES" at 410), procedure 400 returns to block 406. In some embodiments, if it is determined at block 410 that a security scheme is not currently enabled ("NO" at 410), procedure 400 progresses to block 412.

In some embodiments, at block 412, controller device 304 sends a security enablement command, based on predetermined vehicle settings, to one of the one or more control modules 214, e.g., the body control module (BCM) of vehicle 206, via embedded software. In some embodiments, the particular security enablement command is based on the predetermined vehicle settings, as described further below with reference to FIG. 7. The transmission of the security enablement command is described further below with reference to FIG. 6. The procedure 400 then progresses to block 414.

In some embodiments, at block 414, controller device 304 enables a security scheme, based on the security enablement command, via one of the one or more control modules 214, e.g., the BCM of vehicle 206, via embedded software. In some embodiments, the execution of the security scheme is based on predetermined vehicle settings, as described further below with reference to FIG. 7. In some embodiments, controller device 304 enables a brake control scheme, as described further below with reference to FIG. 12A. In some embodiments, controller device 304 enables an accelerator pedal disablement scheme, as described further below with reference to FIG. 12B. In some embodiments, controller device 304 enables a light show activation scheme, as described further below with reference to FIG. 12C. In some embodiments, controller device 304 enables a horn honk activation scheme, as described further below with reference to FIG. 12D. Procedure 400 then returns to block 406.

In some embodiments, at block 416, a determination is made as to whether a security scheme is currently enabled. In particular, for instance, the controller device 304 detects whether one or more of the following security schemes is already enabled: a brake activation scheme, an accelerator pedal scheme, a light show scheme, a horn honk scheme, a driving time limit scheme, a driving distance limit scheme, or a driving speed limit scheme. In some embodiments, the security schemes are preconfigured by a user via a user interface, as described further below with reference to FIG. 7.

In some embodiments, if it is determined at block 416 that a security scheme is not currently enabled ("NO" at 410), procedure 400 returns to block 402. In some embodiments, if it is determined at block 410 that a security scheme is currently enabled ("YES" at 410), procedure 400 progresses to block 418.

In some embodiments, at block 418, controller device 304 sends a security disablement command, based on predetermined vehicle settings, to one of the one or more control modules 214, e.g., the body control module (BCM) of vehicle 206, via embedded software. In some embodiments, the particular security disablement command is based on the predetermined vehicle settings, as described further below with reference to FIG. 7. The transmission of the security disablement command is described further below with reference to FIG. 6. The procedure 400 then progresses to block 420.

In some embodiments, at block 420, controller device 304 disables the security scheme, based on the security disablement command, via one of the one or more control modules 214, e.g., the BCM of vehicle 206, via embedded software. In some embodiments, the disablement of the security scheme is based on predetermined vehicle settings, as described further below with reference to FIG. 7. In some embodiments, controller device 304 disables a brake control scheme, as described further below with reference to FIG. 12A. In some embodiments, controller device 304 disables an accelerator pedal disablement scheme, as described further below with reference to FIG. 12B. In some embodiments, controller device 304 disables a light show activation scheme, as described further below with reference to FIG. 12C. In some embodiments, controller device 304 disables a horn honk activation scheme, as described further below with reference to FIG. 12D. Procedure 400 then returns to block 402.

Figure 5:
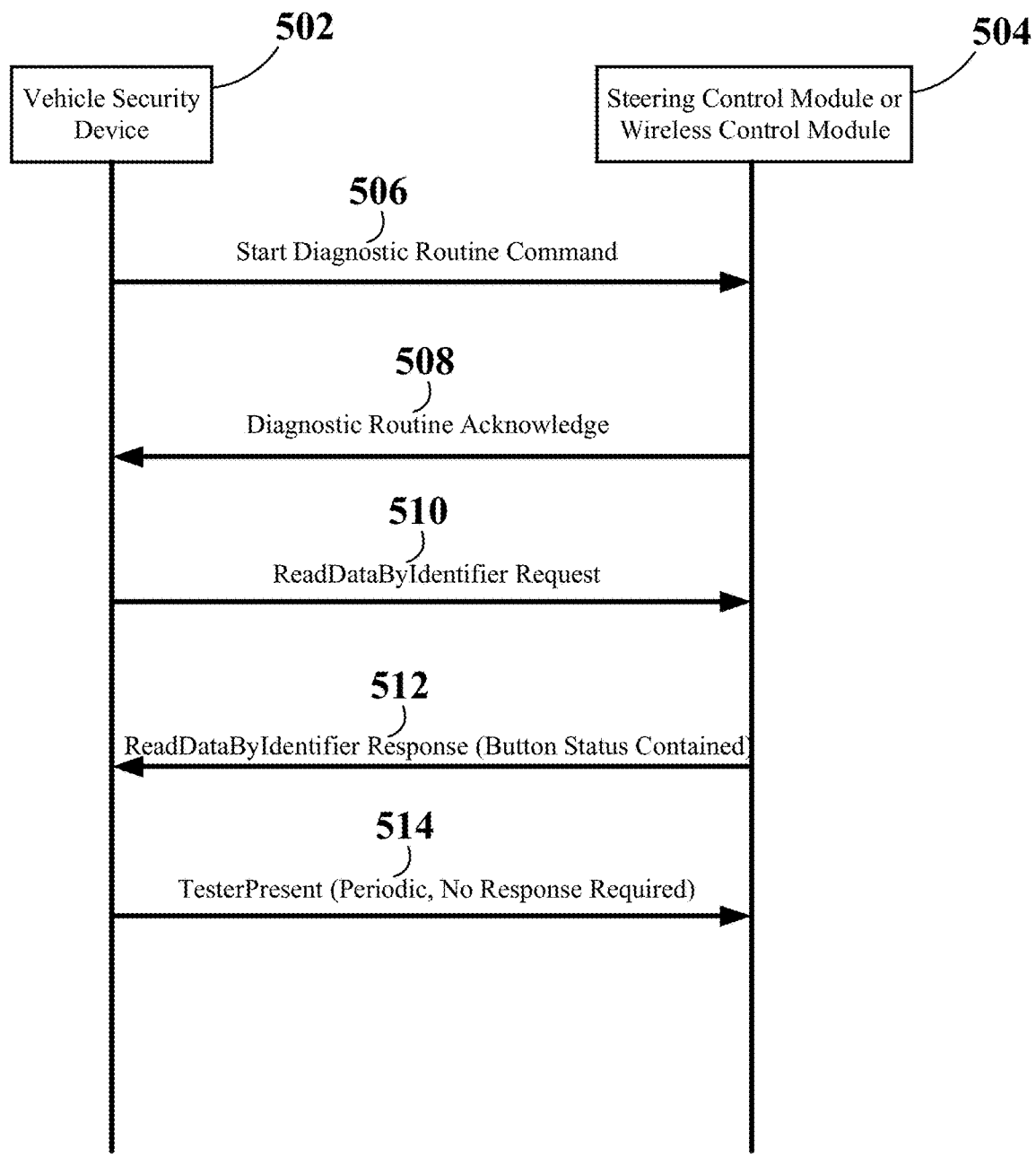
FIG. 5 is a process flow diagram that illustrates aspects of the manner in which the embedded software detects execution of one or more preset authentication verification signals for the vehicle, in accordance with the present disclosure.

Reference is now made to FIG. 5, which is a process flow diagram that illustrates aspects of the manner in which the embedded software detects execution of one or more preset authentication verification signals for the vehicle, in accordance with the present disclosure. The system 500 includes vehicle security device 502 and steering column module (SCM) and/or wireless control module (WCM) 504. In some embodiments, vehicle security device 502 is the onboard diagnostic plug-in device 204, with controller device 304 that can execute embedded software programs. In some embodiments, the SCM and/or the WCM 504 are one or more of the control modules 214 of vehicle 206.

In some embodiments, at 506, the vehicle security device 502 transmits, via embedded software, to the SCM and/or the WCM 504, a "start diagnostic session" command. In some embodiments, at 508, the vehicle security device 502 then receives an acknowledgement of the diagnostic routine commencement from the SCM and/or the WCM 504. Next, in some embodiments, the vehicle security device 502 transmits, via embedded software, to the SCM and/or the WCM 504, a "readDataByIdentifier" request, along with the correct value to read user inputs from the one or more user input/output devices 216. Next, in some embodiments, at 508, the vehicle security device 502 then receives a "readDataByIdentifier" response containing the button status of the one or more user input/output devices 216 from the SCM and/or the WCM. Throughout, in some embodiments, at 514, the vehicle security device 502 transmits, via embedded software, to the SCM and/or the WCM, a "TesterPresent" command periodically (e.g., at least once per second) to keep the "readDataByIdentifier" command running, with no response required from the SCM and/or the WCM 504.

Figure 6:
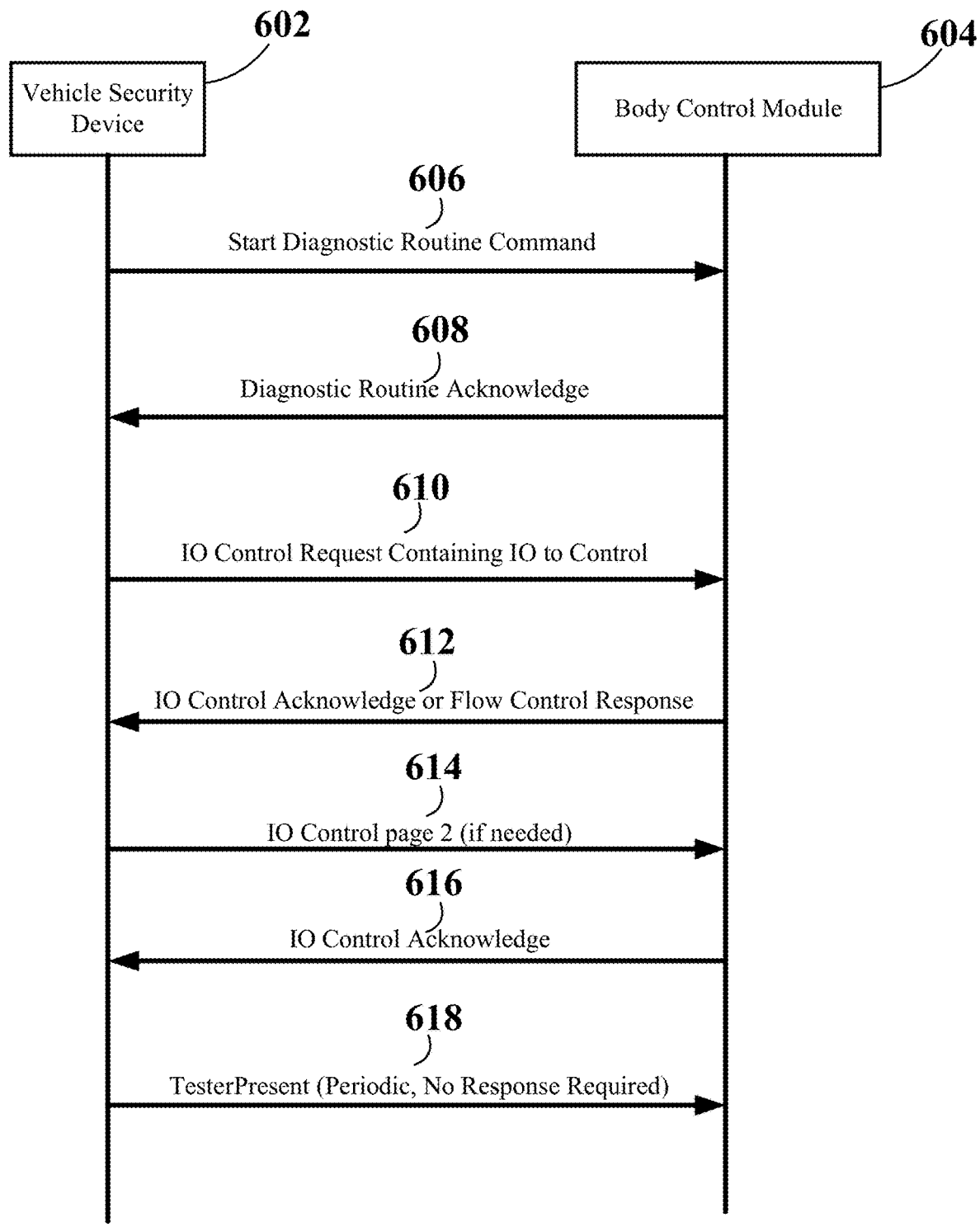
FIG. 6 is a process flow diagram that illustrates aspects of the manner in which the embedded software sends security enablement commands to the body control module (BCM) of the vehicle, in accordance with the present disclosure.

Reference is now made to FIG. 6, which is a process flow diagram that illustrates aspects of the manner in which the embedded software sends security enablement commands to the body control module (BCM) of the vehicle, in accordance with the present disclosure. The system 600 includes vehicle security device 602 and body control module (BCM) 604. In some embodiments, vehicle security device 602 is the onboard diagnostic plug-in device 204, with controller device 304 that can execute embedded software programs. In some embodiments, the BCM 604 is one of the one or more control modules 214 of vehicle 206. The embedded software controls individual vehicular brakes by using unified diagnostic services (UDS) commands and/or ISO KWP commands (depending on the vehicle model) to command an individual brake to be unactuated, or partially actuated, or completely actuated, or to return control of the brake to the electronic control module, which may be any one of control modules 214, of vehicle 206.

In some embodiments, at 606, the vehicle security device transmits, via embedded software, to the BCM 604, a "start diagnostic routine" command. Next, in some embodiments, at 608, the vehicle security device 602 then receives an acknowledgement of the diagnostic routine commencement from the BCM 604. Next, in some embodiments at 610, the vehicle security device 602 transmits an "I/O Control" command, which specifies a vehicle brake of the vehicle brakes 212 of vehicle 206, and whether that brake is to be commanded to be in an unactuated position (e.g., applying no braking force), a partially actuated position (applying an amount of braking force that falls at some point in between zero braking force and full or maximum braking force), or a completely actuated position (applying full or maximum braking force). In some embodiments, at 612, the vehicle security device 602 then receives an acknowledgement of the I/O control command from the BCM 604. Next, if necessary, at 614, the vehicle security device 602 transmits a second "I/O Control" command. In this case, at 616, the vehicle security device 602 then receives a second acknowledgement of the second I/O control command from the BCM 604. Throughout, in some embodiments, at 618, the vehicle security device 602 transmits, via embedded software, to the ABM, a "TesterPresent" command periodically (e.g., at least once per second) to keep the "I/O Control" command running, with no response required from the BCM 604. In some embodiments, after the I/O control is set to return control to the electronic control module, which may be any one of control modules 214, of vehicle 206, an "end diagnostic session" command is transmitted from the vehicle security device 602 to the BCM 604.

Figure 7:
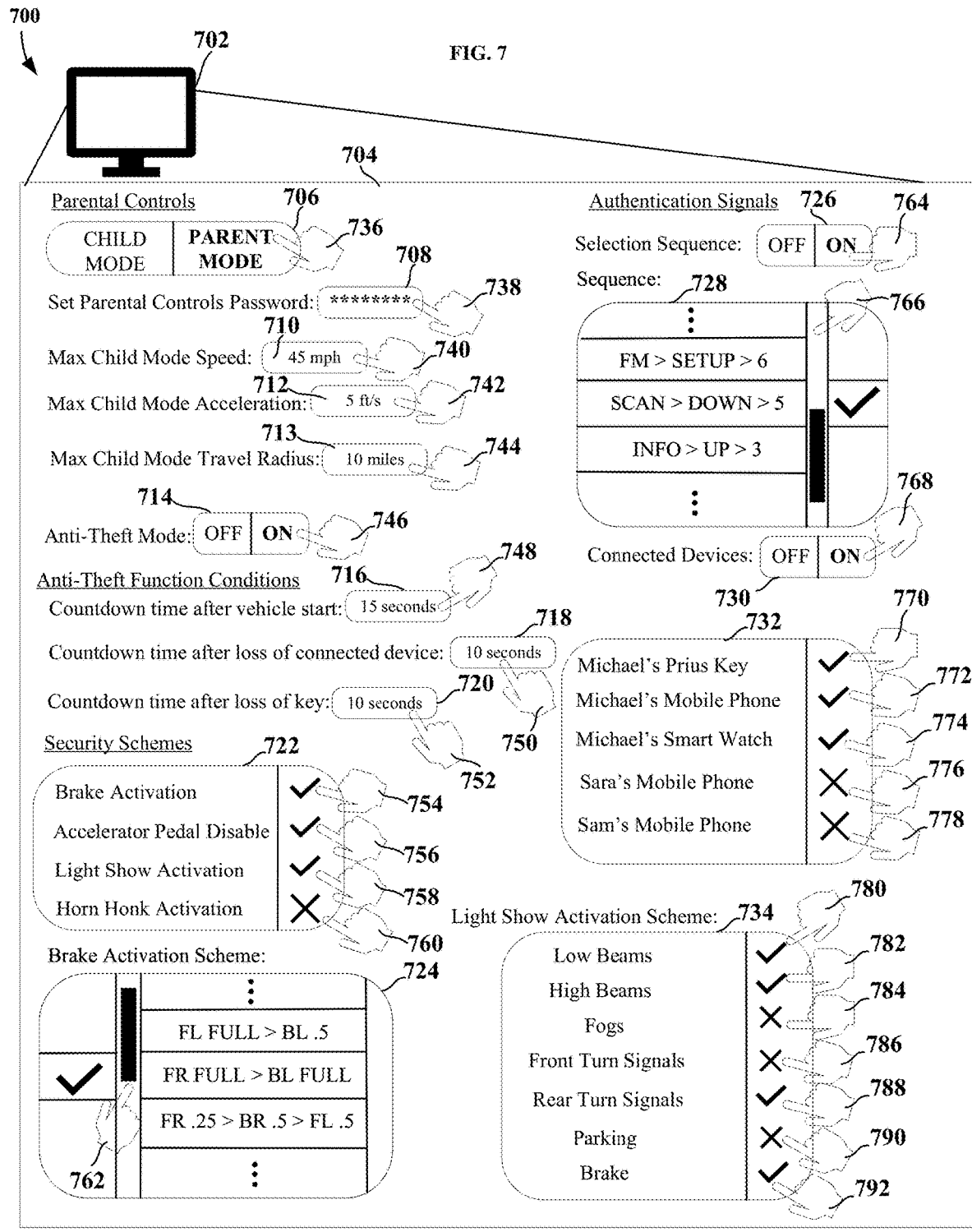
FIG. 7 illustrates an example user interface for preconfiguring the personal computing application, in accordance with the present disclosure.

Reference is now made to FIG. 7, which illustrates an example user interface for preconfiguring the personal computing application, in accordance with the present disclosure. System 700 includes computing device 702 for carrying out the personal computing application, which includes example user interface screen 704, which includes parental control buttons 706, parental controls password entry box 708, max child mode speed entry box 710, max child mode acceleration entry box 712, max child mode travel radius entry box 713, anti-theft mode buttons 714, countdown time after vehicle start entry box 716, countdown time after loss of connected device entry box 718, countdown time after loss of key entry box 720, security scheme grid 722, brake activation scheme grid 724, selection sequence authentication signal buttons 726, selection sequence grid 728, connected device authentication signal buttons 730, connected device grid 732, and light show activation scheme grid 734. In some embodiments, computing device 702 is computing device 202 of FIG. 2.

In some embodiments, the parental control buttons 706 include user selectable options "PARENT MODE" (enable an unrestricted control mode that requires user authentication) and "CHILD MODE" (enable a restricted mode in accordance with parental controls set via parent mode). In some embodiments, the personal computing application receives a user selection 736 of the user selectable option "PARENT MODE," enabling parent mode, which allows for the setting of parental controls via the personal computing application. When child mode is enabled on the personal computing application, the onboard diagnostic plug-in device 204 of FIG. 2 executes a restricted mode of operation on vehicle 206, in accordance with the parental controls set when the personal computing application is in parent mode.

In some embodiments, the personal computing application receives a user selection 738 within parental controls password entry box 708 to set a parental controls password. In some embodiments, after receiving the user selection 736 of the user selectable option "PARENT MODE," the personal computing application prompts a user to enter the preset parental controls password before enabling parent mode on the personal computing application. While in parent mode, a new password can be set within parental controls password entry box 708.

In some embodiments, the personal computing application receives a user selection 740 of a max speed that the vehicle can travel, e.g., 45 miles per hour, at while child mode is enabled in max child mode speed entry box 710. When child mode is enabled on the personal computing application, the onboard diagnostic plug-in device 204 of FIG. 2 restricts the speed of vehicle 206 so that it cannot travel at a higher speed than the maximum speed in max child mode speed entry box 710.

In some embodiments, the personal computing application receives a user selection 742 of a max rate at which the vehicle is able to accelerate, e.g., 5 feet per second, during vehicle operation while in child mode in max child mode acceleration entry box 712. When child mode is enabled on the personal computing application, the onboard diagnostic plug-in device 204 of FIG. 2 restricts the rate of acceleration of vehicle 206 so that it cannot accelerate at a higher rate than the maximum rate in max child mode acceleration entry box 712.

In some embodiments, the personal computing application receives a user selection 744 of a maximum travel radius, e.g., 10 miles, within which the vehicle must remain during operation while in child mode in max child mode travel radius entry box 713. When child mode is enabled on the personal computing application, the onboard diagnostic plug-in device 204 of FIG. 2 restricts the travel radius of vehicle 206 so that it cannot travel out of the range of the max child mode travel radius in max child mode travel radius entry box 713.

In some embodiments, the anti-theft mode buttons 714 include user selectable options "ON" (enable anti-theft mode, which is when one of the anti-theft function conditions are activated an authentication signal is necessary to prevent the activation of a security scheme) and "OFF" (disable anti-theft mode). In some embodiments, the personal computing application receives a user selection 746 of the user selectable option "ON" to enable anti-theft mode. When anti-theft mode is enabled on the personal computing application, the process steps of any one of procedure 400, 1000, 1020, 1030, 1100, 1110, 1120, 1200, 1210, 1220 and/or 1230 may be triggered to occur using the onboard diagnostic plug-in device 204 of FIG. 2. When anti-theft mode is disabled on the personal computing application, the process steps of any one of procedure 400, 1000, 1020, 1030, 1100, 1110, 1120, 1200, 1210, 1220 and/or 1230 will not occur.

In some embodiments, the personal computing application receives a user selection 748 of a countdown time, e.g., 15 seconds, after a vehicle starts in countdown time after vehicle start entry box 716. In some embodiments, when a countdown time is selected, the onboard diagnostic plug-in device 204 of FIG. 2 begins counting down the number of seconds selected in countdown time after vehicle start entry box 716 after vehicle 206 is started, triggering a security scheme if the countdown time expires without an authentication signal. In some embodiments, when a countdown time is set in countdown time after vehicle start entry box 716, the process steps of FIG. 10A may be triggered to occur using the onboard diagnostic plug-in device 204 of FIG. 2.

In some embodiments, the personal computing application receives a user selection 750 of a countdown time, e.g., 10 seconds, after a vehicle loses connection with a connected device in countdown time after loss of connected device entry box 718. In some embodiments, when a countdown time is selected, the onboard diagnostic plug-in device 204 of FIG. 2 begins counting down the number of seconds selected in countdown time after loss of connected device entry box 718 after vehicle 206 loses connection with a connected device, triggering a security scheme if the countdown time expires without an authentication signal. In some embodiments, when a countdown time is set in countdown time after loss of connected device entry box 718, the process steps of FIG. 10B may be triggered to occur using the onboard diagnostic plug-in device 204 of FIG. 2.

In some embodiments, the personal computing application receives a user selection 752 of a countdown time, e.g., 10 seconds, after a key leaves the vehicle in countdown time after loss of key entry box 720. In some embodiments, when a countdown time is selected, the onboard diagnostic plug-in device 204 of FIG. 2 begins counting down the number of seconds selected in countdown time after loss of key entry box 720 after vehicle 206 loses connection with a connected device, triggering a security scheme if the countdown time expires without an authentication signal. In some embodiments, when a countdown time is set countdown time after loss of key entry box 720, the process steps of FIG. 10C may be triggered to occur using the onboard diagnostic plug-in device 204 of FIG. 2.

In some embodiments, the security scheme grid 722 includes user selectable options, checkmark (to enable) and X (to disable) the brake activation security scheme, the accelerator pedal disable security scheme, the light show activation security scheme, and the horn honk activation security scheme. In some embodiments, the personal computing application receives a user selection 754 to enable the brake activation security scheme. In some embodiments, when the brake activation security scheme is enabled in security scheme grid 722, the process steps of FIG. 12A may be triggered to occur using the onboard diagnostic plug-in device 204 of FIG. 2. In some embodiments, the personal computing application receives a user selection 756 to enable the accelerator pedal disablement security scheme. In some embodiments, when the accelerator pedal disablement security scheme is enabled in security scheme grid 722, the process steps of FIG. 12B may be triggered to occur using the onboard diagnostic plug-in device 204 of FIG. 2. In some embodiments, the personal computing application receives a user selection 758 to enable the light show activation security scheme. In some embodiments, when the light show activation security scheme is enabled in security scheme grid 722, the process steps of FIG. 12C may be triggered to occur using the onboard diagnostic plug-in device 204 of FIG. 2. In some embodiments, the personal computing application receives a user selection 760 to enable the horn honk activation security scheme. In some embodiments, when the brake activation security scheme is enabled in security scheme grid 722, the process steps of FIG. 12D may be triggered to occur using the onboard diagnostic plug-in device 204 of FIG. 2.

In some embodiments, when the brake activation security scheme is enabled in security scheme grid 722, the brake actuation patterns for the brake activation security scheme can be set in brake activation scheme grid 724. In some embodiments, the brake activation scheme grid 724 contains brake actuation patterns, e.g., "FL FULL>BL.5," "FR FULL>BL FULL," and "FR 0.25>BR 0.5>FL.5," with "F" meaning one of the front brakes, "B" meaning one of the back brakes, "L" meaning one of the left brakes, "R" meaning one of the right brakes, "Full" meaning full actuation, "0.5" meaning 50% actuation, and "0.25" meaning 25% actuation. In some embodiments, the personal computing application receives a user scroll action 762 to align the checkmark with an actuation pattern, e.g., "FR FULL>BL FULL." In this instance, this causes the brake actuation pattern lined up with the checkmark to be carried out by vehicle 206 when the brake activation security scheme is triggered to occur using the onboard diagnostic plug-in device 204 of FIG. 2.

In some embodiments, selection sequence authentication signal buttons 726 include user selectable options "ON" (to enable) and "OFF (to disable) the use of selection sequences as authentication verification signals. In some embodiments, the personal computing application receives a user selection 764 of the user selectable option "ON" to enable selection sequence authentication. When selection sequence authentication is enabled on the personal computing application, the process steps of FIG. 11A may be triggered to occur using the onboard diagnostic plug-in device 204 of FIG. 2. When selection sequence authentication is disabled on the personal computing application, the process steps of FIG. 11A will not occur.

In some embodiments, selection sequence grid 728 includes selection sequence options, e.g., "FM>SETUP>6," "SCAN>DOWN>5," and "INFO>UP>3." In some embodiments, the personal computing application receives a user scroll action 766 to align the checkmark with a selection sequence, e.g., "SCAN>DOWN>5." In some instances, this causes the selection sequence lined up with the checkmark to be a preset authentication verification signal for vehicle 206 using the onboard diagnostic plug-in device 204 of FIG. 2.

In some embodiments, connected device authentication signal buttons 730 include user selectable options "ON" (to enable) and "OFF (to disable) the use of connected devices as authentication verification signals. In some embodiments, the personal computing application receives a user selection 768 of the user selectable option "ON" to enable connected device authentication. When connected device authentication is enabled on the personal computing application, the process steps of FIG. 11B may be triggered to occur using the onboard diagnostic plug-in device 204 of FIG. 2. When selection sequence authentication is disabled on the personal computing application, the process steps of FIG. 11B will not occur.

In some embodiments, connected device grid 732 includes user selectable options, checkmark (to connect) and X (to disconnect) different Bluetooth devices and key fobs that, when connected and paired, act as authentication signals for vehicle 206 when using the onboard diagnostic plug-in device 204 of FIG. 2. In some embodiments, the personal computing application receives user selections 770-778 to connect and disconnect various devices associated with vehicle 206.

In other embodiments, not shown in FIG. 7, there are many other options for authentication verification signals that can be preconfigured on the personal computing application and carried out using the onboard diagnostic plug-in device 204 of FIG. 2 when plugged into vehicle 206. In some embodiments, users can set in-vehicle selection sequences by selecting a sequence of 1 to 6 presses of various steering wheel buttons. In this example, the sequence is displayed on the instrument cluster of the vehicle as it is being entered (in the Audio menu), with a 2 second timeout or cruise on/off press to start over. In some examples, there are many choices on the in-vehicle selection sequence menu. In some embodiments, "Set/Clear PIN" enables users to set a new sequence (if unlocked) or clear the current sequence (quick if unlocked, timed if locked). In some embodiments, the option "Enable/Disable PIN," enables a quick disable without having to clear and then re-set the sequence. In some embodiments, the option "PedalDisable" enables a high security parking mode where users can pre-disable the gas pedal, which can be toggled on and off and automatically and is re-enabled when a sequence is entered. In some embodiments, the option "PIN Brakes," enables the 4 brakes to lock when the vehicle is stopped and a sequence is not entered. In some embodiments, the option "PIN Horn," enables the horn to blow in a semi-random pattern when a sequence is not entered. In some embodiments, the option "PIN Lights," enables the light show to start when the sequence is not entered. In some embodiments, the option "AccelKill," enables the accelerator pedal to be disabled when a sequence is not entered, disables the accelerator pedal if the vehicle alarm is triggered or a key pairing is attempted. In some embodiments, if enabled, this function will operate even if selection sequences are disabled. In some embodiments, when the accelerator pedal is disabled, there will be several warning chimes and lights as if there are vehicle errors, and when re-enabling the pedal while the vehicle is running, the engine may stumble or stall. In some embodiments, the option "KillByFob," enables locking the vehicle by key fob to disable the accelerator pedal. In this embodiment, unlocking with the same fob will re-enable the pedal. In some embodiments, if enabled, this function will operate even if the selection sequence function is disabled. In some embodiments, if a selection sequence is set and the vehicle is entered without using the same key fob used to lock it, the sequence will need to be entered to unlock. In some embodiments, the exterior lights will be flashed two extra times to show as confirmation the pedal has been disabled or enabled. In some embodiments, the option "PIN Clear Time" enables a user to preset whether it should take 10 or 60 minutes to clear a forgotten PIN.

In some embodiments, light show activation scheme grid 734 includes user selectable options, checkmark (to enable) and X (to disable) certain lights on vehicle 206 to be illuminated when light show activation is an enabled security scheme in security scheme grid 722 and when light show activation is triggered by the onboard diagnostic plug-in device 204 of FIG. 2. In some embodiments, the personal computing application receives user selections 770-778 to enable and disable illumination of various lights associated with vehicle 206.

Reference is now made to FIG. 8, which is a process flow diagram that illustrates an example procedure for preconfiguring the personal computing application, in accordance with the present disclosure. In some embodiments, the personal computing application may be computing device 702 of FIG. 7.

In some embodiments, at block 802, the personal computing application receives user selections of one or more vehicle operation modes and settings for the one or more vehicle operation modes via the user interface screen. In some embodiments, the user interface screen may be the user interface screen 704 of FIG. 7. In some embodiments, the user selections of one or more vehicle operation modes and settings for the one or more vehicle operation modes are carried out on parental control buttons 706, parental controls password entry box 708, max child mode speed entry box 710, max child mode acceleration entry box 712, max child mode travel radius entry box 713, anti-theft mode buttons 714. The user selections may be changed at any time through the personal computing application; when either child mode, anti-theft mode, or both modes are enabled on the personal computing application, the process steps of any one of procedure 400, 1000, 1020, 1030, 1100, 1110, 1120, 1200, 1210, 1220 and/or 1230 may be triggered. When parent mode is enabled or anti-theft mode is disabled on the personal computing application, the process steps of any one of procedure 400, 1000, 1020, 1030, 1100, 1110, 1120, 1200, 1210, 1220 and/or 1230 will not occur. In some embodiments, process 800 then proceeds to block 804, wherein the personal computing application stores the user selection of the one or more vehicle operation modes and the settings for the one or more vehicle operation modes in a memory, e.g., memory 222 of FIG. 2. In some embodiments, process 800 then proceeds to block 806.

In some embodiments, at block 806, the personal computing application receives user selections of options to set the one or more predetermined vehicle conditions and settings for the one or more predetermined vehicle conditions via the user interface screen. In some embodiments, the user selections of options to set the one or more predetermined vehicle conditions and settings for the one or more predetermined vehicle conditions are carried out on countdown time after vehicle start entry box 716, countdown time after loss of connected device entry box 718, and countdown time after loss of key entry box 720. The user selections may be changed at any time through the personal computing application. In some embodiments, process 800 then proceeds to block 808, wherein the personal computing application stores the user selections of the options to set the one or more predetermined vehicle conditions and settings for the one or more predetermined vehicle conditions in the memory. In some embodiments, process 800 then proceeds to block 810.

In some embodiments, at block 810, the personal computing application receives user selections of one or more preset authentication verification signals for the vehicle and settings for the one or more preset authentication verification signals for the vehicle via the user interface screen. In some embodiments, the user selections of one or more preset authentication verification signals for the vehicle and settings for the one or more preset authentication verification signals for the vehicle are carried out on selection sequence authentication signal buttons 726, selection sequence grid 728, connected device authentication signal buttons 730, and connected device grid 732. The user selections may be changed at any time through the personal computing application. In some embodiments, process 800 then proceeds to block 812, wherein the personal computing application stores the user selections of the one or more preset authentication verification signals for the vehicle and the settings for the one or more preset authentication verification signals for the vehicle in the memory. In some embodiments, process 800 then proceeds to block 814.

In some embodiments, at block 814, the personal computing application receives user selections of one or more security schemes for the vehicle and settings for the one or more security schemes for the vehicle via the user interface screen. In some embodiments, the user selections of one or more security schemes for the vehicle and settings for the one or more security schemes for the vehicle are carried out on security scheme grid 722, brake activation scheme grid 724, and light show activation scheme grid 734. In some embodiments, process 800 then proceeds to block 816, wherein the personal computing application stores, in the memory, the user selections of one or more security schemes for the vehicle and settings for the one or more security schemes for the vehicle.

Figure 9:
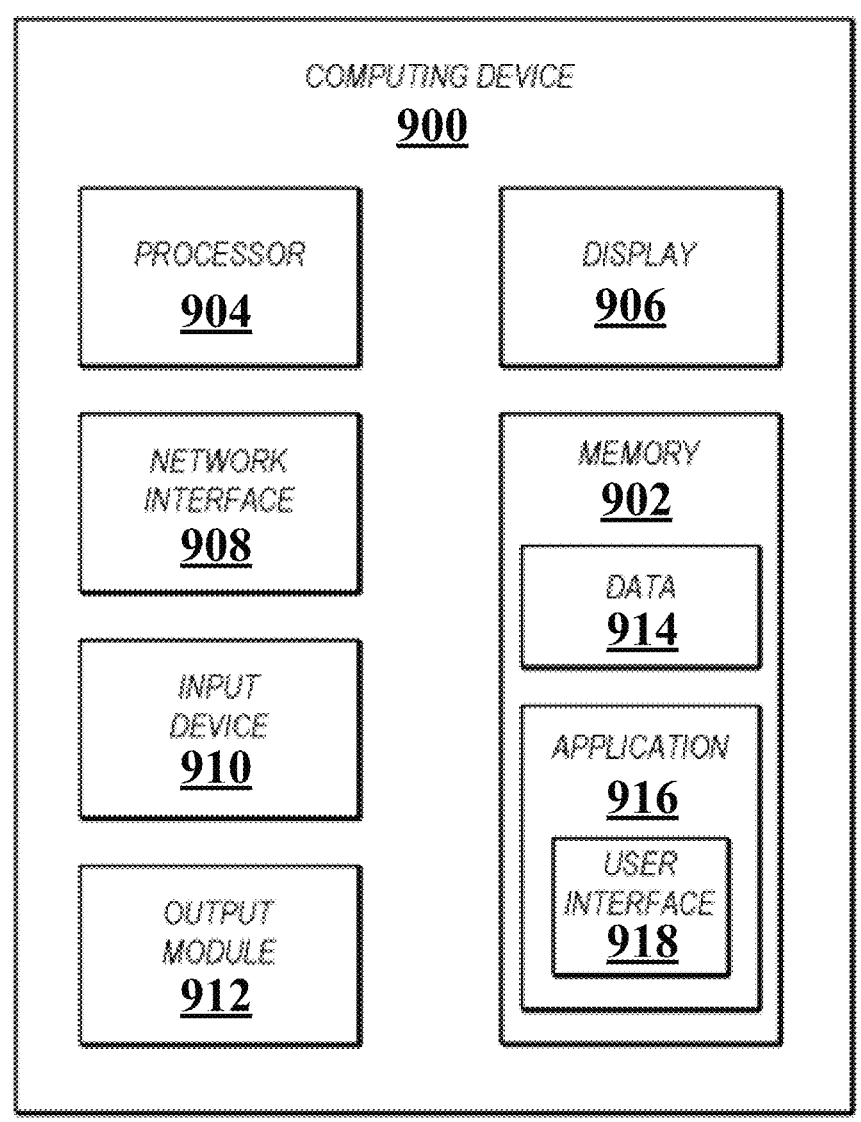
FIG. 9 is a schematic block diagram of an example computing device that may be employed in various embodiments of the present disclosure.

Reference is now made to FIG. 9, which is a schematic block diagram of an example computing device that may be employed in various embodiments of the present disclosure. Although not explicitly shown in FIG. 2 or FIG. 3, in some example embodiments, the computing device 900, or one or more components thereof, are included in, and/or employed within, one or more components of the system 200, such as, for example, the computing device 202, the onboard diagnostic plug-in device 204, and/or other components. In this regard, the computing device 900, or one or more of the components thereof, may further represent one or more components of the system 200, such as, for example, the computing device 202, and the onboard diagnostic plug-in device 204.

The computing device 900, may, in various embodiments, include one or more memories 902, processors 904, displays 906, network interfaces 908, input devices 910, and/or output modules 912. The memory 902 includes non-transitory computer-readable storage media for storing data and/or software that is executable by the processor 904 and which controls the operation of the computing device 900. In an example embodiment, the memory 902 may include one or more solid-state storage devices such as flash memory chips. Alternatively, or in addition to the one or more solid-state storage devices, the memory 902 may include one or more mass storage devices connected to the processor 904 through a mass storage controller (not shown in FIG. 9) and a communications bus (not shown in FIG. 9). Although the description of computer-readable media contained herein refers to a solid-state storage, it should be appreciated by those skilled in the art that computer-readable storage media can be any available media that can be accessed by the processor 904. That is, computer readable storage media includes non-transitory, volatile and non-volatile, removable and non-removable media implemented in any method or technology for storage of information such as computer-readable instructions, data structures, program modules or other data. Examples of computer-readable storage media include RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information, which can be accessed by computing device 900.

In some embodiments, the memory 902 stores data 914 and/or an application 916. In some aspects, the application 916 includes a user interface component 918 that, when executed by the processor 904, causes the display 906 to present a user interface (not shown in FIG. 9), such as user interface screen 704 within FIG. 7. The network interface 908, in some examples, is configured to couple the computing device 900 and/or individual components thereof to a network, such as a wired network, a wireless network, a local area network (LAN), a wide area network (WAN), a wireless mobile network, a Bluetooth network, the Internet, and/or another type of network. The input device 910 may be any device by means of which a user may interact with the computing device 900. Examples of the input device 910 include without limitation a mouse, a keyboard, a touch screen, a voice interface, and/or the like. The output module 912 may, in various embodiments, include any connectivity port or bus, such as, for example, a parallel port, a serial port, a universal serial bus (USB), or any other similar connectivity port known to those skilled in the art.

Reference is now made to FIG. 10A, which is a process flow diagram that illustrates additional aspects of the example procedure for mobile device control of vehicle security features of FIG. 4, in accordance with the present disclosure. The procedure 1000, in some examples, begins when the onboard diagnostic plug-in device 204 is plugged into the communication port 208 and receives power from the vehicle 206 by way of one or more pins or conductors of the communication port 208.

In some embodiments, at block 1002, controller device 304 monitors whether a vehicle, e.g., vehicle 206 of FIG. 2, has been started. In some embodiments, procedure 1000 then proceeds to block 1004. In some embodiments, at block 1004, a determination is made as to whether the vehicle has been started. For example, the controller device 304 detects whether the engine of vehicle 206 has been turned on. In some embodiments, if it is determined at block 1004 that the vehicle has not been started ("NO" at 1004), then the procedure 1000 returns to block 1002. If, on the other hand, it is determined at block 1004 that the vehicle has been started ("YES" at 1004), then the procedure 1000 progresses to block 1006.

In some embodiments, at block 1006, controller device 304 begins a preconfigured length of countdown time. In some embodiments, the predetermined length of countdown time is preconfigured by a user via a user interface, as described further above with reference to FIG. 7. In some embodiments, procedure 1000 then progresses to block 406, as described further above with reference to FIG. 4. In some embodiments, procedure 1000 then progresses to block 1010.

In some embodiments, at block 1010, a determination is made as to whether the preconfigured length of countdown time after the vehicle was started has expired. For example, controller device 304 detects whether the preconfigured length of countdown time after the vehicle has expired. In some embodiments, if it is determined at block 1010 that the preconfigured length of countdown time has not expired ("NO" at 1010), then the procedure 1000 returns to block 406. If, on the other hand, it is determined at block 1010 that the preconfigured length of countdown time has expired ("YES" at 1010), then the procedure 1000 progresses to block 408, as described further above with reference to FIG. 4, and continues to progress in the same way as procedure 400, beginning from block 408.

Figure 10B:
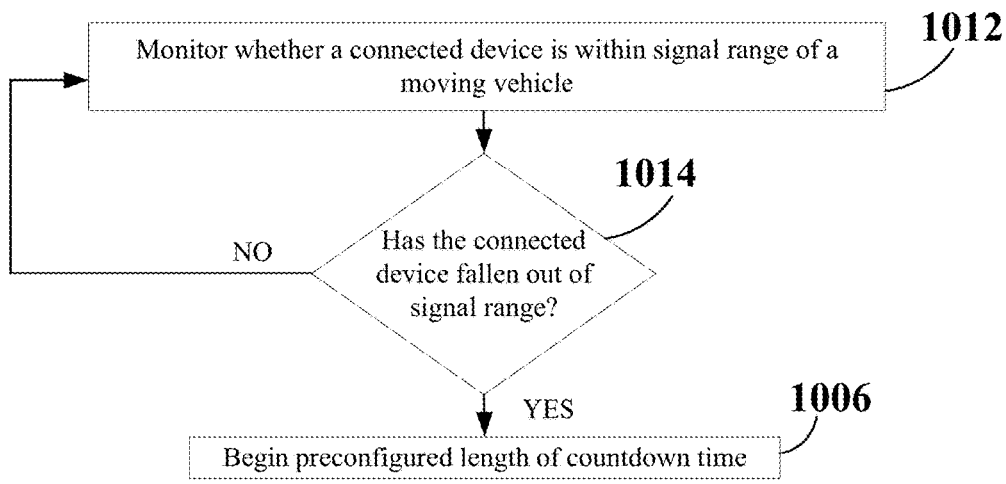
FIG. 10B is a process flow diagram that illustrates still further aspects of the example procedure for mobile device control of vehicle security features of FIG. 4, in accordance with the present disclosure.

Reference is now made to FIG. 10B, which is a process flow diagram that illustrates additional aspects of the example procedure for mobile device control of vehicle security features of FIG. 4, in accordance with the present disclosure. The procedure 1020, in some examples, begins when the onboard diagnostic plug-in device 204 is plugged into the communication port 208 and receives power from the vehicle 206 by way of one or more pins or conductors of the communication port 208.

In some embodiments, at block 1012, controller device 304 monitors whether a connected device is within signal range of a moving vehicle, e.g., vehicle 206 of FIG. 2. In some embodiments, the connected device is one of the one or more devices enabled within connected device grid 732 of FIG. 7. In some embodiments, procedure 1020 then proceeds to block 1014. In some embodiments, at block 1014, a determination is made as to whether the connected device has fallen out of signal range. For example, the controller device 304 detects whether the connected device is still within signal range of vehicle 206. In some embodiments, if it is determined at block 1014 that the connected device has not fallen out of signal range ("NO" at 1014), then the procedure 1020 returns to block 1012. If, on the other hand, it is determined at block 1014 that the connected device has fallen out of signal range ("YES" at 1014), then the procedure 1020 progresses to block 1006, as described further above with reference to FIG. 10A, and continues to progress in the same way as FIG. 10A, beginning from block 1006.

Figure 10C:
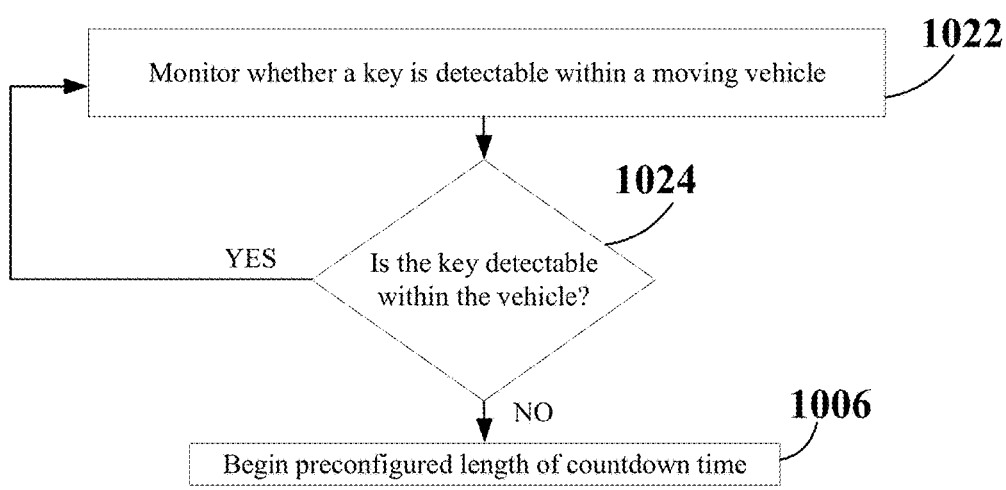
FIG. 10C is a process flow diagram that illustrates still further aspects of the example procedure for mobile device control of vehicle security features of FIG. 4, in accordance with the present disclosure.

Reference is now made to FIG. 10C, which is a process flow diagram that illustrates additional aspects of the example procedure for mobile device control of vehicle security features of FIG. 4, in accordance with the present disclosure. The procedure 1030, in some examples, begins when the onboard diagnostic plug-in device 204 is plugged into the communication port 208 and receives power from the vehicle 206 by way of one or more pins or conductors of the communication port 208.

In some embodiments, at block 1022, controller device 304 monitors whether a key is detectable within a moving vehicle, e.g., vehicle 206 of FIG. 2. In some embodiments, the key is one of the one or more devices enabled within connected device grid 732 of FIG. 7. In some embodiments, procedure 1030 then proceeds to block 1024. In some embodiments, at block 1024, a determination is made as to whether the key is detectable within the vehicle. For example, the controller device 304 detects whether the key is still within signal range of vehicle 206. In some embodiments, if it is determined at block 1024 that the key is detectable within the vehicle ("YES" at 1024), then the procedure 1030 returns to block 1022. If, on the other hand, it is determined at block 1004 that the key is not detectable within the vehicle ("NO" at 1024), then the procedure 1000 progresses to block 1006, as described further above with reference to FIG. 10A, and continues to progress in the same way as FIG. 10A, beginning from block 1006. In some embodiments, controller device 304 senses a key fob pairing attempt by monitoring the CAN bus for a diagnostic command being sent to radio frequency hub (RFH) module.

Figure 11A:
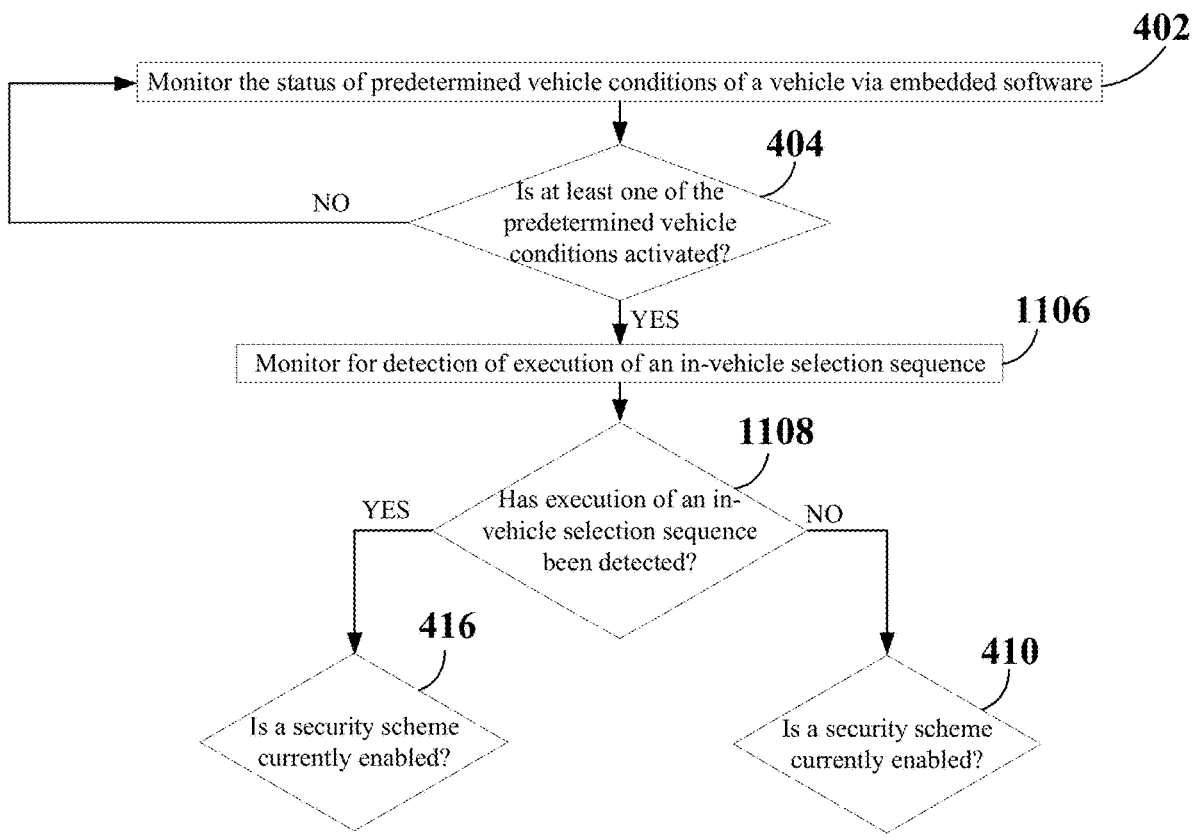
FIG. 11A is a process flow diagram that illustrates still further aspects of the example procedure for mobile device control of vehicle security features of FIG. 4, in accordance with the present disclosure.

Reference is now made to FIG. 11A, which is a process flow diagram that illustrates additional aspects of the example procedure for mobile device control of vehicle security features of FIG. 4, in accordance with the present disclosure. The procedure 1100, in some examples, begins when the onboard diagnostic plug-in device 204 is plugged into the communication port 208 and receives power from the vehicle 206 by way of one or more pins or conductors of the communication port 208.

In some embodiments, procedure 1100 progresses from block 402, as described further above with reference to FIG. 4, to block 404, as described further above with reference to FIG. 4. In some embodiments, if it is determined at block 404 that none of the predetermined vehicle conditions of the vehicle are activated ("NO" at 404) the procedure 1100 returns to block 402. If, on the other hand, it is determined at block 404 that at least one of the predetermined vehicle conditions of the vehicle are activated ("YES" at 404), then the procedure 1100 progresses to block 1106.

In some embodiments, at block 1106, controller device 304 monitors for detection of execution of an in-vehicle selection sequence. In some embodiments, in-vehicle selection sequences are preconfigured by a user via a user interface, as described further above with reference to FIG. 7. In some embodiments, procedure 1100 then proceeds to block 1108.

In some embodiments, at block 1108, a determination is made as to whether execution of an in-vehicle selection sequence has been detected. For example, controller device 304 determines whether in-vehicle selection sequence has been carried out within vehicle 206. In some embodiments, if it is determined at block 1108 that an in-vehicle selection sequence has been detected ("YES" at 1108) the procedure 1100 proceeds to block 416, as described further above with reference to FIG. 4, and continues to progress in the same way as FIG. 4, beginning from block 416. If, on the other hand, it is determined at block 1108 that no in-vehicle selection sequence has been detected ("NO" at 1108) the procedure 1100 proceeds to block 410, as described further above with reference to FIG. 4, and continues to progress in the same way as FIG. 4, beginning from block 410.

Figure 11B:
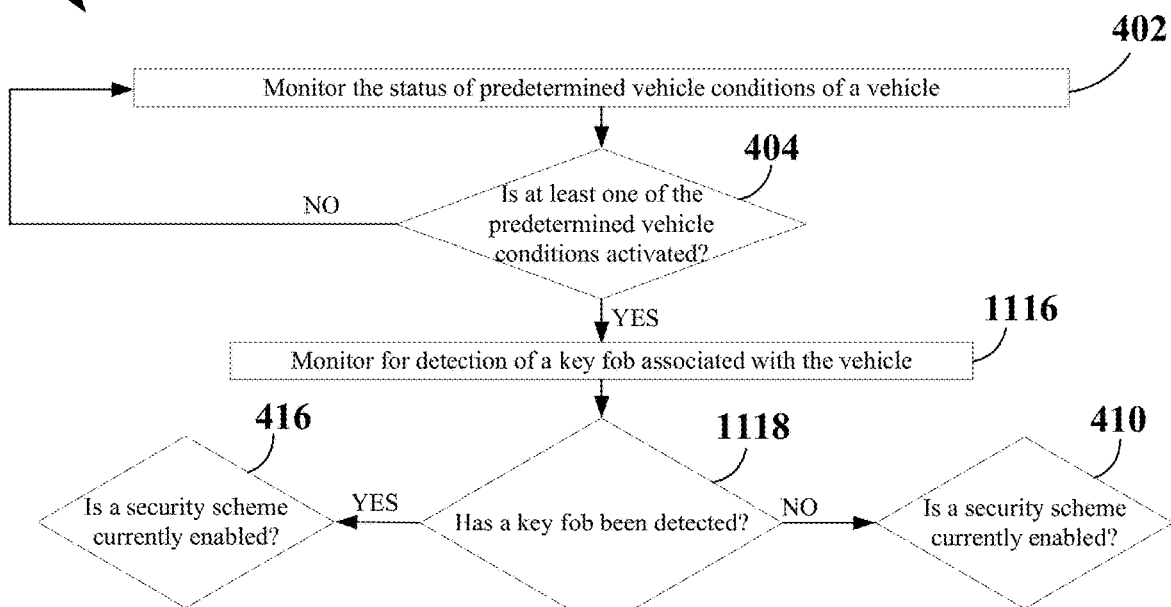
FIG. 11B is a process flow diagram that illustrates still further aspects of the example procedure for mobile device control of vehicle security features of FIG. 4, in accordance with the present disclosure.

Reference is now made to FIG. 11B, which is a process flow diagram that illustrates additional aspects of the example procedure for mobile device control of vehicle security features of FIG. 4, in accordance with the present disclosure. The procedure 1110, in some examples, begins when the onboard diagnostic plug-in device 204 is plugged into the communication port 208 and receives power from the vehicle 206 by way of one or more pins or conductors of the communication port 208.

In some embodiments, procedure 1110 progresses from block 402, as described further above with reference to FIG. 4, to block 404, as described further above with reference to FIG. 4. In some embodiments, if it is determined at block 404 that none of the predetermined vehicle conditions of the vehicle are activated ("NO" at 404) the procedure 1110 returns to block 402. If, on the other hand, it is determined at block 404 that at least one of the predetermined vehicle conditions of the vehicle are activated ("YES" at 404), then the procedure 1110 progresses to block 1116.

In some embodiments, at block 1116, controller device 304 monitors for detection of a key fob associated with the vehicle. In some embodiments, key fob recognition is preconfigured by a user via a user interface, as described further above with reference to FIG. 7. In some embodiments, procedure 1110 then proceeds to block 1118.

In some embodiments, at block 1118, a determination is made as to whether the key fob has been detected. For example, controller device 304 determines whether the key fob is within vehicle 206. In some embodiments, if it is determined at block 1118 that the key fob has been detected ("YES" at 1118) the procedure 1110 proceeds to block 416, as described further above with reference to FIG. 4, and continues to progress in the same way as FIG. 4, beginning from block 416. If, on the other hand, it is determined at block 1108 that the key fob has not been detected ("NO" at 1118) the procedure 1110 proceeds to block 410, as described further above with reference to FIG. 4, and continues to progress in the same way as FIG. 4, beginning from block 410. In some examples, if the key is not detected, turn signals on the dash will flash and click. In some examples, if the key is not detected, a "key fob not detected" message will be displayed along with a repeated audible chime. In some embodiments, to display the "key fob not detected" message, text on dash, turn signal flash and click, audible chimes, and most other functions, CAN bus data is read and/or sent on the CAN bus. In some embodiments, in order for controller device 304 to sense the key fob ID for KillByFob function, controller device 304 starts a diagnostic session with the radio frequency hub (RFH) module, requests ID via diagnostic command, writes this ID to device EEPROM when LOCK is pressed, reads the lock ID from device EEPROM when UNLOCK is pressed, compares it to the current device ID to check for a match, and closes the diagnostic session.

Figure 11C:
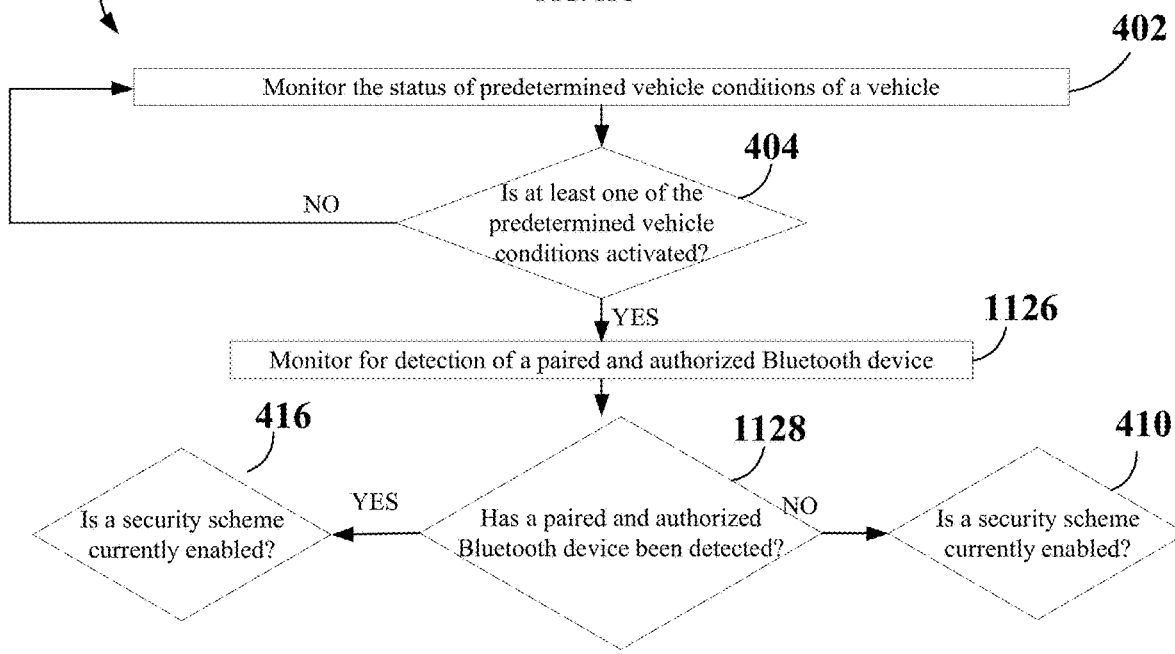
FIG. 11C is a process flow diagram that illustrates still further aspects of the example procedure for mobile device control of vehicle security features of FIG. 4, in accordance with the present disclosure.

Reference is now made to FIG. 11C, which is a process flow diagram that illustrates additional aspects of the example procedure for mobile device control of vehicle security features of FIG. 4, in accordance with the present disclosure. The procedure 1120, in some examples, begins when the onboard diagnostic plug-in device 204 is plugged into the communication port 208 and receives power from the vehicle 206 by way of one or more pins or conductors of the communication port 208.

In some embodiments, procedure 1120 progresses from block 402, as described further above with reference to FIG. 4, to block 404, as described further above with reference to FIG. 4. In some embodiments, if it is determined at block 404 that none of the predetermined vehicle conditions of the vehicle are activated ("NO" at 404) the procedure 1120 returns to block 402. If, on the other hand, it is determined at block 404 that at least one of the predetermined vehicle conditions of the vehicle are activated ("YES" at 404), then the procedure 1120 progresses to block 1126.

In some embodiments, at block 1116, controller device 304 monitors for detection of a paired and authorized Bluetooth device associated with the vehicle. In some embodiments, Bluetooth device pairing is preconfigured by a user via a user interface, as described further above with reference to FIG. 7. In some embodiments, procedure 1120 then proceeds to block 1128.

In some embodiments, at block 1128, a determination is made as to whether the paired and authorized Bluetooth device has been detected. For example, controller device 304 determines whether the paired and authorized Bluetooth device is connected to vehicle 206. In some embodiments, if it is determined at block 1128 that the paired and authorized Bluetooth device has been detected ("YES" at 1128) the procedure 1120 proceeds to block 416, as described further above with reference to FIG. 4, and continues to progress in the same way as FIG. 4, beginning from block 416. If, on the other hand, it is determined at block 1128 that the paired and authorized Bluetooth device has not been detected ("NO" at 1128) the procedure 1120 proceeds to block 410, as described further above with reference to FIG. 4, and continues to progress in the same way as FIG. 4, beginning from block 410.

Figure 12A:
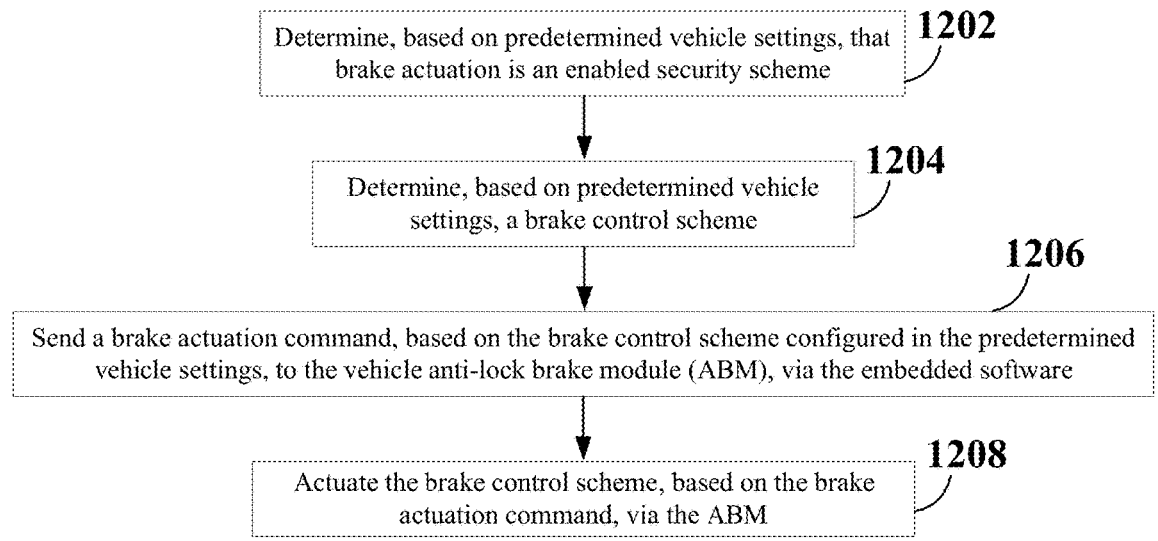
FIG. 12A is a process flow diagram that illustrates still further aspects of the example procedure for mobile device control of vehicle security features of FIG. 4, in accordance with the present disclosure.

Reference is now made to FIG. 12A, which is a process flow diagram that illustrates additional aspects of the example procedure for mobile device control of vehicle security features of FIG. 4, in accordance with the present disclosure. The procedure 1200, in some examples, begins after a determination that a security scheme is not currently enabled ("NO" at 410) at block 410, as described further above with reference to FIG. 4, and the steps of procedure 1200 are alternative descriptions of blocks 412 and 414, as described further above with reference to FIG. 4.

In some embodiments, at block 1202, controller device 304 determines, based on predetermined vehicle settings, that brake actuation is an enabled security scheme. In some embodiments, security scheme enablement is preconfigured by a user via a user interface, as described further above with reference to FIG. 7. In some embodiments, procedure 1200 then progresses to block 1204.

In some embodiments, at block 1204, controller device 304 determines, based on the predetermined vehicle settings, a brake control scheme. In some embodiments, the specific brake control scheme is preconfigured by a user via a user interface, as described further above with reference to FIG. 7. In some embodiments, procedure 1200 then progresses to block 1206. In some embodiments, at block 1206, controller device 304 sends a brake actuation command, based on the brake control scheme configured in the predetermined vehicle settings, to the vehicle anti-lock brake module (ABM). In some embodiments, procedure 1200 then progresses to block 1208. In some embodiments, at block 1208, controller device 304 actuates the brake control scheme, based on the brake actuation command, via the ABM.

Figure 12B:
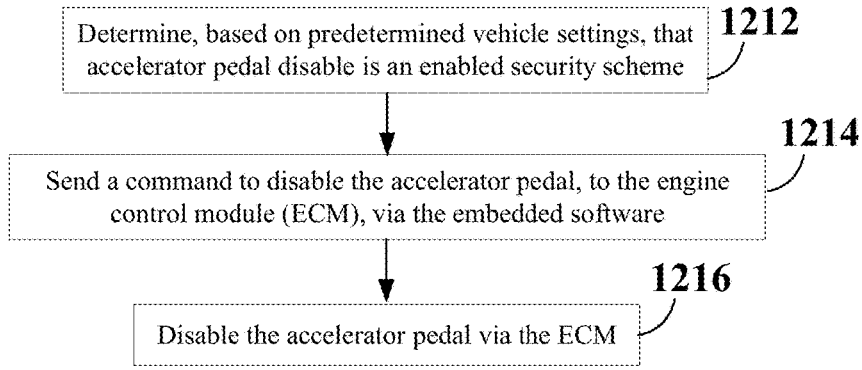
FIG. 12B is a process flow diagram that illustrates still further aspects of the example procedure for mobile device control of vehicle security features of FIG. 4, in accordance with the present disclosure.

Reference is now made to FIG. 12B, which is a process flow diagram that illustrates additional aspects of the example procedure for mobile device control of vehicle security features of FIG. 4, in accordance with the present disclosure. The procedure 1210, in some examples, begins after a determination that a security scheme is not currently enabled ("NO" at 410) at block 410, as described further above with reference to FIG. 4, and the steps of procedure 1210 are alternative descriptions of blocks 412 and 414, as described further above with reference to FIG. 4.

In some embodiments, at block 1212, controller device 304 determines, based on predetermined vehicle settings, that accelerator pedal disable is an enabled security scheme. In some embodiments, security scheme enablement is preconfigured by a user via a user interface, as described further above with reference to FIG. 7. In some embodiments, procedure 1210 then progresses to block 1214.

In some embodiments, at block 1214, controller device 304 sends a command to disable the accelerator pedal, to the engine control module (ECM). In one example, the embedded software of controller device 304 sends and receives signals (e.g., commands, acknowledgements) to and from the ECM to effectively disable the accelerator pedal by replacing the electrically erasable programmable read-only memory (EEPROM) for the learned pedal limits to values that are not recognized by the ECM. In this example, the engine of the vehicle will remain at idle regardless of the accelerator pedal position. In some embodiments, procedure 1210 then progresses to block 1216. In some embodiments, at block 1216, controller device 304 disables the accelerator pedal via the ECM. In some embodiments, controller device 304 monitors authentication verification signals to determine when to disable the Accelerator Pedal Disable and write the original EEPROM values to the ECM so the vehicle can be driven in the conventional manner. In some embodiments, in order to disable the accelerator pedal, the controller device 304 starts a diagnostic session, requests the version or the power control module (PCM) to check that it is compatible, requests the current value of one of the accelerator pedal parameters stored in EEPROM, if it is determined to be an in-range "good" value, stores this value in the device's EEPROM, unlocks the PCM using seed/key algorithm to enable EEPROM write access, writes an out-of-range "bad" value to the PCM EEPROM, and closes the diagnostic session. In some embodiments, to later re-enable the accelerator pedal, the controller device 304 starts a diagnostic session, requests the PCM version to check that it is a compatible version, requests the current value of one of the accelerator pedal parameters stored in the EEPROM, If it is the "bad" value set above, retrieves the original PCM value from the, device's EEPROM, unlocks the PCM using seed/key algorithm to enable EEPROM write access, writes the stored "good" value to the PCM EEPROM, and then closes the diagnostic session.

Figure 12C:
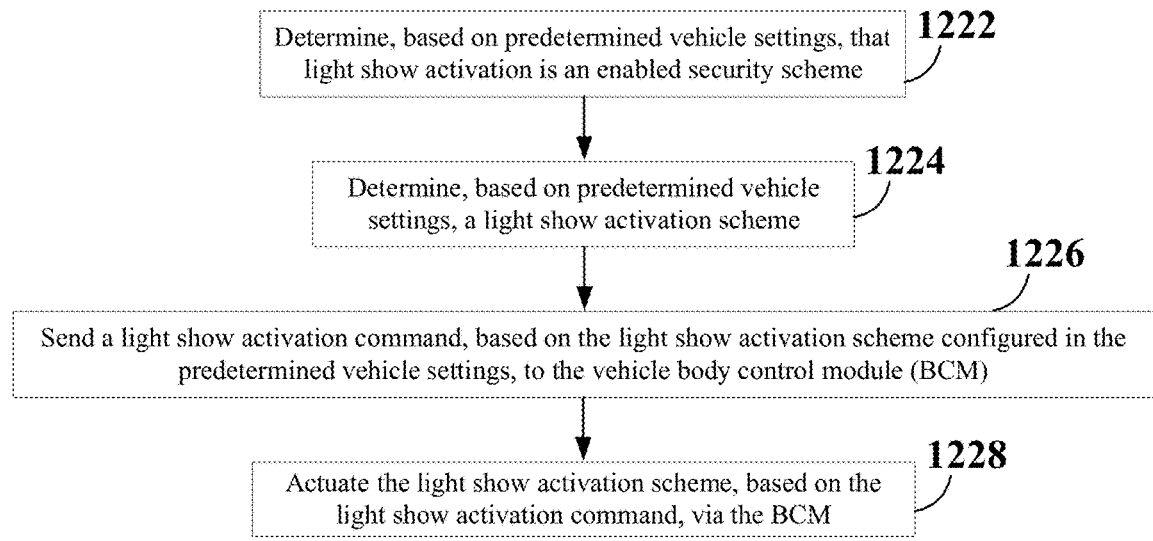
FIG. 12C is a process flow diagram that illustrates still further aspects of the example procedure for mobile device control of vehicle security features of FIG. 4, in accordance with the present disclosure.

Reference is now made to FIG. 12C, which is a process flow diagram that illustrates additional aspects of the example procedure for mobile device control of vehicle security features of FIG. 4, in accordance with the present disclosure. The procedure 1220, in some examples, begins after a determination that a security scheme is not currently enabled ("NO" at 410) at block 410, as described further above with reference to FIG. 4, and the steps of procedure 1220 are alternative descriptions of blocks 412 and 414, as described further above with reference to FIG. 4.

In some embodiments, at 1222, controller device 304 determines, based on predetermined vehicle settings, that light show activation is an enabled security scheme. In some embodiments, security scheme enablement is preconfigured by a user via a user interface, as described further above with reference to FIG. 7. In some embodiments, procedure 1220 then progresses to block 1224.

In some embodiments, at block 1224, controller device 304 determines, based on the predetermined vehicle settings, a light show activation scheme. In some embodiments, the specific light show activation scheme is preconfigured by a user via a user interface, as described further above with reference to FIG. 7. In some embodiments, procedure 1220 then progresses to block 1226. In some embodiments, at block 1226, controller device 304 sends a light show activation command, based on the light show activation scheme configured in the predetermined vehicle settings, to the vehicle body control module (BCM). In some embodiments, procedure 1220 then progresses to block 1228. In some embodiments, at block 1228, controller device 304 actuates the light show activation scheme, based on the light show actuation command, via the BCM.

Figure 12D:
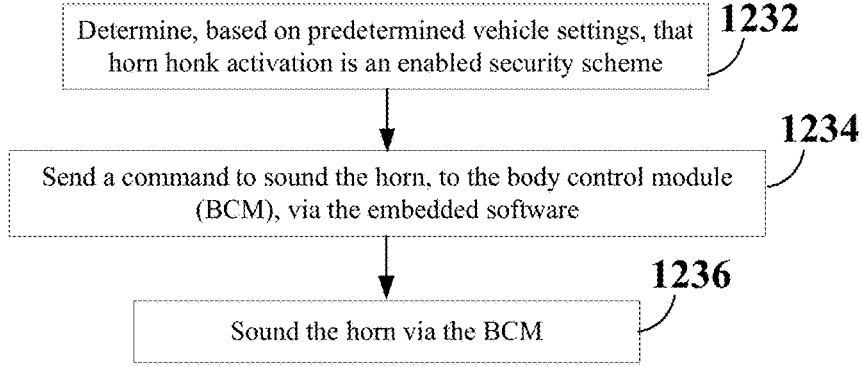
FIG. 12D is a process flow diagram that illustrates still further aspects of the example procedure for mobile device control of vehicle security features of FIG. 4, in accordance with the present disclosure.

Reference is now made to FIG. 12D, which is a process flow diagram that illustrates additional aspects of the example procedure for mobile device control of vehicle security features of FIG. 4, in accordance with the present disclosure. The procedure 1230, in some examples, begins after a determination that a security scheme is not currently enabled ("NO" at 410) at block 410, as described further above with reference to FIG. 4, and the steps of procedure 1230 are alternative descriptions of blocks 412 and 414, as described further above with reference to FIG. 4.

In some embodiments, at 1232, controller device 304 determines, based on predetermined vehicle settings, that horn honk activation is an enabled security scheme. In some embodiments, security scheme enablement is preconfigured by a user via a user interface, as described further above with reference to FIG. 7. In some embodiments, procedure 1230 then progresses to block 1234.

In some embodiments, at block 1234, controller device 304 sends a command to sound the horn, to the body control module of the vehicle. In some embodiments, procedure 1230 then progresses to block 1236. In some embodiments, at block 1236, controller device 304 sounds the horn via the BCM. In some embodiments, the horn is sounded in patterns designed to attract attention to the vehicle.

The example embodiments described herein may be implemented using hardware, software or any combination thereof and may be implemented in one or more computer systems or other processing systems. Additionally, one or more of the steps described in the example embodiments herein may be implemented, at least in part, by machines. Example machines that may be useful for performing the operations of the example embodiments herein include general purpose digital computers, specially programmed computers, desktop computers, server computers, client computers, portable computers, mobile communication devices, tablets, and/or similar devices.

The above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for mobile device control of vehicle security features, the method comprising:
 monitoring, via embedded software, statuses of predetermined vehicle conditions of a vehicle; and in response to detecting, via the embedded software, activation of one or more of the predetermined vehicle conditions:
  monitoring the vehicle, via the embedded software, to detect an execution of one or more preset authentication verification signals for the vehicle; and
  in response to detecting, via the embedded software, no execution of any preset authentication verification signals for the vehicle:
    based on predetermined vehicle settings:
      sending, via the embedded software, a security enablement command to a body control module (BCM) of the vehicle; and
      based on the security enablement command:
        enabling, via the BCM, one or more security schemes.

2. The method of claim 1, further comprising:
in response to detecting, via the embedded software, the execution of one or more preset authentication verification signals for the vehicle:
  in response to determining that one or more of the one or more security schemes are currently enabled:
    sending, via the embedded software, a security disablement command to the BCM; and
    based on the security disablement command:
      disabling, via the BCM, the one or more security schemes.

3. The method of claim 1, wherein the activation of one or more of the predetermined vehicle conditions comprises one of more of: expiration of a preconfigured length of countdown time after the vehicle is started, expiration of a preconfigured length of countdown time after a connected mobile device falls out of signal range, or expiration of a preconfigured length of countdown time after a key leaves the vehicle.

4. The method of claim 1, wherein the one or more preset authentication verification signals for the vehicle comprise one or more of in-vehicle selection sequences, detection of a paired and authorized Bluetooth device, or detection of a key fob associated with the vehicle.

5. The method of claim 4, wherein the in-vehicle selection sequences comprise one or more particular button presses of buttons located on a dashboard of the vehicle, a steering wheel of the vehicle and key fobs associated with the vehicle.

6. The method of claim 1, wherein the one or more security schemes comprise one or more of a brake activation scheme, an accelerator pedal scheme, a light show scheme, a horn honk scheme, a driving time limit scheme, a driving distance limit scheme, or a driving speed limit scheme.

7. The method of claim 1, wherein the one or more preset authentication verification signals for the vehicle and the one or more security schemes are preconfigured by a user via a personal computing application.

8. The method of claim 7, wherein preconfiguring the personal computing application comprises:
receiving, via a user interface screen, user selections of one or more vehicle operation modes and settings for the one or more vehicle operation modes, wherein the settings for the vehicle operation modes comprise security enablement commands corresponding to security schemes;
storing, in a memory, the user selections of the one or more vehicle operation modes and the settings for the one or more vehicle operation modes;
receiving, via the user interface screen, user selections of options to set one or more predetermined vehicle conditions and settings for the one or more predetermined vehicle conditions;
storing, in the memory, the user selections of the options to set the one or more predetermined vehicle conditions and settings for the one or more predetermined vehicle conditions;
receiving, via the user interface screen, user selections of the one or more preset authentication verification signals for the vehicle and settings for the one or more preset authentication verification signals for the vehicle; and
storing, in the memory, the user selections of the one or more preset authentication verification signals for the vehicle and settings for the one or more preset authentication verification signals for the vehicle;
receiving, via the user interface screen, user selections of one or more security schemes for the vehicle and settings for the one or more security schemes for the vehicle; and
storing, in the memory, the user selections of one or more security schemes for the vehicle and settings for the one or more security schemes for the vehicle.

9. The method of claim 1, wherein the embedded software detects the each execution of the one or more preset authentication verification signals for the vehicle by broadcasting information relating to the one or more preset authentication verification signals on a communication bus of the vehicle, wherein the communication bus is a controller area network (CAN) bus.

10. The method of claim 1, wherein the embedded software detects the each execution of one or more preset authentication verification signals for the vehicle by polling one or more of a steering column module (SCM) and a wireless control module (WCM) of the vehicle by transmitting an I/O read request and awaiting a response.

11. The method of claim 9, wherein polling one or more of the SCM and the WCM of the vehicle by transmitting an I/O read request and awaiting a response further comprises:
transmitting, via the embedded software, to one or more of the SCM and the WCM, a command to start a diagnostic session;
transmitting, via the embedded software, to one or more of the SCM and the WCM, a command to read the each preset authentication verification signal for the vehicle, along with correct values to read the each preset authentication verification signal for the vehicle; and
transmitting, via the embedded software, to one or more of the SCM and the WCM, a periodic tester command to ensure the command to read the each preset authentication verification signal for the vehicle is running.

12. The method of claim 1, wherein sending, via the embedded software, the security enablement command to the BCM, further comprises:
transmitting, via the embedded software, to the BCM, a command to start a diagnostic session;
transmitting, via the embedded software, to the BCM, one or more input/output control commands, wherein the one or more input/output control commands each specify: one or more particular vehicle brakes and an actuation level of the each one or more particular vehicle brakes, a vehicle accelerator pedal and an actuation level of the vehicle accelerator pedal, one or more particular vehicle lights and an actuation level of the each one or more particular vehicle lights, and a vehicle horn and an actuation level of the vehicle horn;

transmitting, via the embedded software, to the BCM, a periodic tester command to ensure the one or more input/output control commands are running; and transmitting, via the embedded software, a command to end the diagnostic session.

13. An onboard diagnostic plug-in dongle device comprising:
- a shell;
- a plug;
- a printed circuit (PC) board comprising:
  - a microcontroller; and
  - a memory storing embedded program instructions that, when executed by the microcontroller, cause the microcontroller to perform operations comprising:
    - monitoring, via embedded software, statuses of predetermined vehicle conditions of a vehicle; and
    - in response to detecting, via the embedded software, activation of one or more of the predetermined vehicle conditions:
      - monitoring the vehicle, via the embedded software, to detect an execution of one or more preset authentication verification signals for the vehicle; and
      - in response to detecting, via the embedded software, no execution of any preset authentication verification signals for the vehicle:
        - based on predetermined vehicle settings:
          - sending, via the embedded software, a security enablement command to a body control module (BCM) of the vehicle; and
          - based on the security enablement command:
            - enabling, via the BCM, one or more security schemes.

14. The onboard diagnostic plug-in dongle device of claim 13, wherein the PC board further comprises:
- a controller area network (CAN) controller;
- a physical layer device (PHY);
- a universal serial bus (USB) bridge and connector; and
- an indicator LED.

15. The onboard diagnostic plug-in dongle device of claim 14, wherein the microcontroller executes the embedded software via the CAN controller and the PHY.

16. The onboard diagnostic plug-in dongle device of claim 13, wherein the plug is an On-Board Diagnostic OBD2 plug, and wherein the plug is installed into an OBD2 diagnostic connector of the vehicle.

17. The onboard diagnostic plug-in dongle device of claim 13, wherein the plug is installed by unplugging a vehicle security gateway (SGW) module of the vehicle and plugging the onboard diagnostic plug-in dongle device in its place, directly or via an extension cable.

18. The onboard diagnostic plug-in dongle device of claim 13, wherein the onboard diagnostic plug-in dongle device further comprises a bypass module that bypasses the security gateway (SGW) of the vehicle.

19. The onboard diagnostic plug-in dongle device of claim 14, wherein the microcontroller communicates with a personal computing application via the USB bridge and connector.

20. A non-transitory computer readable medium comprising instructions that, when executed by a microcontroller of an onboard diagnostic plug-in dongle, cause the microcontroller to perform operations comprising:
- monitoring, via embedded software, statuses of predetermined vehicle conditions of a vehicle; and
- in response to detecting, via the embedded software, activation of one or more of the predetermined vehicle conditions:
  - monitoring the vehicle, via the embedded software, to detect an execution of one or more preset authentication verification signals for the vehicle; and
  - in response to detecting, via the embedded software, no execution of any preset authentication verification signals for the vehicle:
    - based on predetermined vehicle settings:
      - sending, via the embedded software, a security enablement command to a body control module (BCM) of the vehicle; and
      - based on the security enablement command:
        - enabling, via the BCM, one or more security schemes.

* * * * *